US012633049B2

(12) United States Patent
Wannerberg et al.

(10) Patent No.: US 12,633,049 B2
(45) Date of Patent: May 19, 2026

(54) SYSTEMS AND METHODS FOR PROVIDING SEMANTICS-BASED RECOMMENDATIONS FOR THREE-DIMENSIONAL CONTENT CREATION

(71) Applicant: Adeia Guides Inc., San Jose, CA (US)

(72) Inventors: Petter Wannerberg, Lidingö (SE);
Saad Azhar, Västerås (SE)

(73) Assignee: Adeia Guides Inc., San Jose, CA (US)

( * ) Notice: Subject to any disclaimer, the term of this patent is extended or adjusted under 35 U.S.C. 154(b) by 202 days.

(21) Appl. No.: 18/430,312

(22) Filed: Feb. 1, 2024

(65) Prior Publication Data

US 2025/0252661 A1 Aug. 7, 2025

(51) Int. Cl.
G06T 17/00 (2006.01)
(52) U.S. Cl.
CPC .................................... G06T 17/00 (2013.01)
(58) Field of Classification Search
CPC ...................................................... G06T 17/00
USPC .......................................................... 345/419
See application file for complete search history.

(56) References Cited

U.S. PATENT DOCUMENTS

| | | | |
|---|---|---|---|
| 7,512,537 B2 | 3/2009 | Pahud et al. | |
| 10,607,084 B1 * | 3/2020 | Tang | G06F 16/7837 |
| 12,373,495 B2 * | 7/2025 | Mahadevan | G06T 19/20 |
| 2017/0006343 A1 * | 1/2017 | Miller | H04N 21/4524 |
| 2018/0307909 A1 * | 10/2018 | O'Brien | G06T 19/006 |
| 2020/0020011 A1 * | 1/2020 | Harvill | G06Q 30/0621 |

| | | | |
|---|---|---|---|
| 2021/0327112 A1 * | 10/2021 | Palmaro | G06T 7/11 |
| 2022/0357914 A1 * | 11/2022 | Krishnamurthy | G10L 15/26 |
| 2022/0415476 A1 * | 12/2022 | Connor | G06V 20/20 |
| 2023/0196943 A1 * | 6/2023 | Varnado | A63F 13/85 |
| | | | 434/116 |
| 2023/0271330 A1 * | 8/2023 | Sundaralingam | B25J 9/163 |
| | | | 700/246 |

(Continued)

FOREIGN PATENT DOCUMENTS

| | | |
|---|---|---|
| CN | 111190522 A | 5/2020 |

OTHER PUBLICATIONS

"3D Models", Turbosquid, available online at <https://www.turbosquid.com/Search/3D-Models>, retrieved on Jan. 10, 2025, 17 pages.

(Continued)

*Primary Examiner* — David T Welch
(74) *Attorney, Agent, or Firm* — HALEY GUILIANO LLP

(57) ABSTRACT

Systems and methods are described for providing for display a user interface to facilitate creation of a three-dimensional (3D) environment. The disclosed techniques may generate the 3D environment based on one or more inputs received via the user interface, and perform visual processing of the 3D environment to obtain a natural language description of the 3D environment. The disclosed techniques may determine a context of the 3D environment based at least in part on the natural language description and may store the context in a data structure. A 3D content library may be queried, based on the natural language description of the 3D environment, to identify at least one recommended 3D object that is relevant to the stored context of the 3D environment. The disclosed techniques may providing for display, at the user interface, selectable option(s) to add the at least one recommended 3D object to the 3D environment.

20 Claims, 18 Drawing Sheets

(56) References Cited

U.S. PATENT DOCUMENTS

| | | | | |
|---|---|---|---|---|
| 2023/0401802 A1* | 12/2023 | Maschmeyer | ..... | G06Q 30/0643 |
| 2024/0212265 A1* | 6/2024 | Agarwal | ............. | G10L 15/1815 |
| 2024/0386733 A1* | 11/2024 | Garg | .................... | G06V 10/267 |
| 2025/0166368 A1* | 5/2025 | Connor | .................. | G06V 10/86 |
| 2025/0181138 A1* | 6/2025 | Schüller | ................. | G06T 13/40 |
| 2025/0181207 A1* | 6/2025 | Klingler | .................. | G06T 17/00 |
| 2025/0181424 A1* | 6/2025 | Klingler | ................ | G06F 16/211 |
| 2025/0181847 A1* | 6/2025 | Schüller | .................. | G06F 40/30 |
| 2025/0182365 A1* | 6/2025 | Klingler | .................. | G06F 9/453 |
| 2025/0182366 A1* | 6/2025 | Klingler | .................. | G06F 3/017 |
| 2025/0184291 A1* | 6/2025 | Schüller | .................. | H04L 51/02 |
| 2025/0184292 A1* | 6/2025 | Schüller | .................. | H04L 51/02 |
| 2025/0184293 A1* | 6/2025 | Klingler | .................. | H04L 51/02 |

OTHER PUBLICATIONS

"3D painting software for texturing—Adobe Substance 3D", Adobe, available online at <https://www.adobe.com/products/substance3d/apps/painter.html?sdid=J7XBWKW3&mv=search&mv2=paidsearch&gad_source=1&gclid=CjwKCAiAm-67BhBIEiwAEVftNiWue0r3yhHPZslgS5Jcv1VkiCqBzlfoEGJq11aY10w8TOnkV7P92hoCsCAQAvD_BwE>, retrieved on Jan. 10, 2025, pp. 1-11.

"3D world-building made easy", Quixel, available online at < https://quixel.com/>, retrieved on Jan. 10, 2025, pp. 1-9.

"CLIP: Connecting text and images", OpenAI, Jan. 5, 2021, available online at <https://openai.com/index/clip/, pp. 1-14.

"DALL·E 2", OpenAI, available online at <https://openai.com/index/dall-e-2/>, retrieved on Jan. 8, 2025, pp. 1-9.

"Easily Create 3D Models in Minutes", Masterpiece X—Generate 3D Models With AI, available online at <https://www.masterpiecex.com>, retrieved on Jan. 8, 2025, pp. 1-6.

"Introducing Whisper", OpenAI, Sep. 21, 2022, available online at <https://openai.com/index/whisper/>, pp. 1-5.

"Megascans-#1 choice for games, VFX, archviz and beyond", Quixel, available online at <https://quixel.com/megascans>, retrieved on Jan. 8, 2025, pp. 1-6.

"What Is a Graph Database?", Oracle, Nov. 5, 2024, available online at <https://www.oracle.com/in/autonomous-database/what-is-graph-database/#:~:text=Today%2C%20graph%20databases%20are%20increasingly,rather%20than%20hours%20or%20days.>, pp. 1-8.

"What We See-Future Today Institute", Future Today Institute, 17th Edition, 2024, available online at <https://futuretodayinstitute.com/trends/, retrieved on Jan. 8, 2025, 12 pages.

"WordNet", Princeton, available online at <https://wordnet.princeton.edu>, retrieved on Jan. 8, 2025, pp. 1-2.

Ha, H. et al., "Semantic Abstraction: Open-World 3D Scene Understanding from 2D Vision-Language Models", arXiv:2207.11514, Dec. 6, 2022, pp. 1-16.

Monica Villanueva Aylagas, "Reconstruction and recommendation of realistic 3D models using cGANs", Master in Machine Learning, Jun. 15, 2018, 70 pages.

Moon, J. et al., "Scene understanding using natural language description based on 3D semantic graph map", Intelligent Service Robotics, vol. 11, Oct. 2018, pp. 347-354.

OpenAI "Introducing ChatGPT," available online at https://web.archive.org/web/20231103120713/https:/openai.com/blog/chatgpt/#expand, Nov. 30, 2022, 5 pages.

U.S. Appl. No. 18/591,612, filed Feb. 29, 2024. Title: Goods and Services Content Selection Based on Environment Scans. (Not provided; USPTO in possession of specification, claims, and prosecution history).

Wald, J. et al., "Learning 3D Semantic Scene Graphs from 3D Indoor Reconstructions", Youtube, available online at <https://www.youtube.com/watch?v=Z7THFA1ies0>, retrieved on Jan. 8, 2025, 60 pages.

Wald, J. et al., "Learning 3D Semantic Scene Graphs with Instance Embeddings", International Journal of Computer Vision, vol. 130, Issue 3, Mar. 1, 2022, pp. 630-651.

* cited by examiner

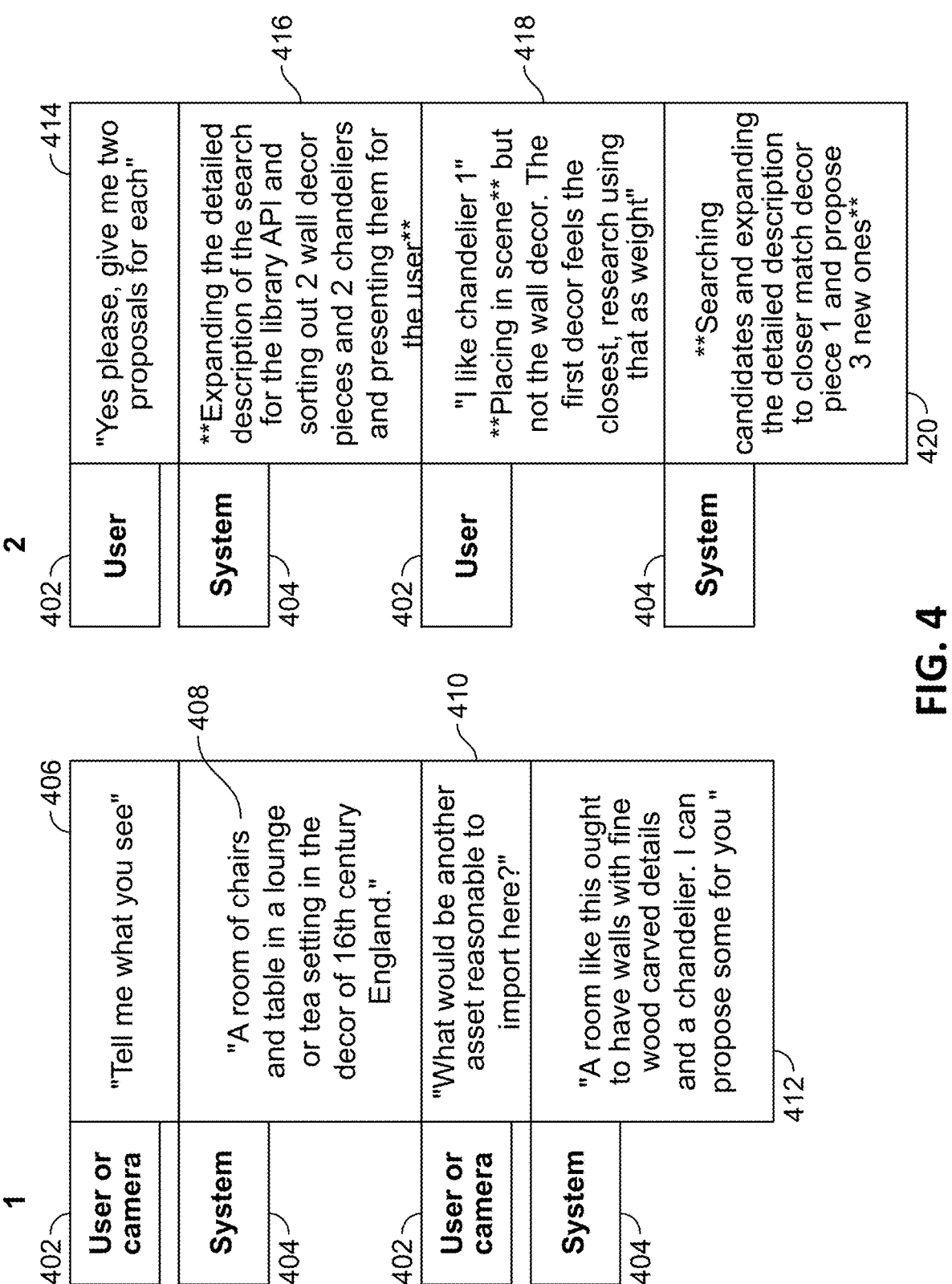

1

| | |
|---|---|
| User or camera 402 | "Tell me what you see" 406 |
| System 404 | "A room of chairs and table in a lounge or tea setting in the decor of 16th century England." 408 |
| User or camera 402 | "What would be another asset reasonable to import here?" 410 |
| System 404 | "A room like this ought to have walls with fine wood carved details and a chandelier. I can propose some for you " 412 |

2 414

| | |
|---|---|
| User 402 | "Yes please, give me two proposals for each" |
| System 404 | Expanding the detailed description of the search for the library API and sorting out 2 wall decor pieces and 2 chandeliers and presenting them for the user 416 |
| User 402 | "I like chandelier 1" Placing in scene but not the wall decor. The first decor feels the closest, research using that as weight" 418 |
| System 404 | Searching candidates and expanding the detailed description to closer match decor piece 1 and propose 3 new ones 420 |

FIG. 4

User Input Interface

Display

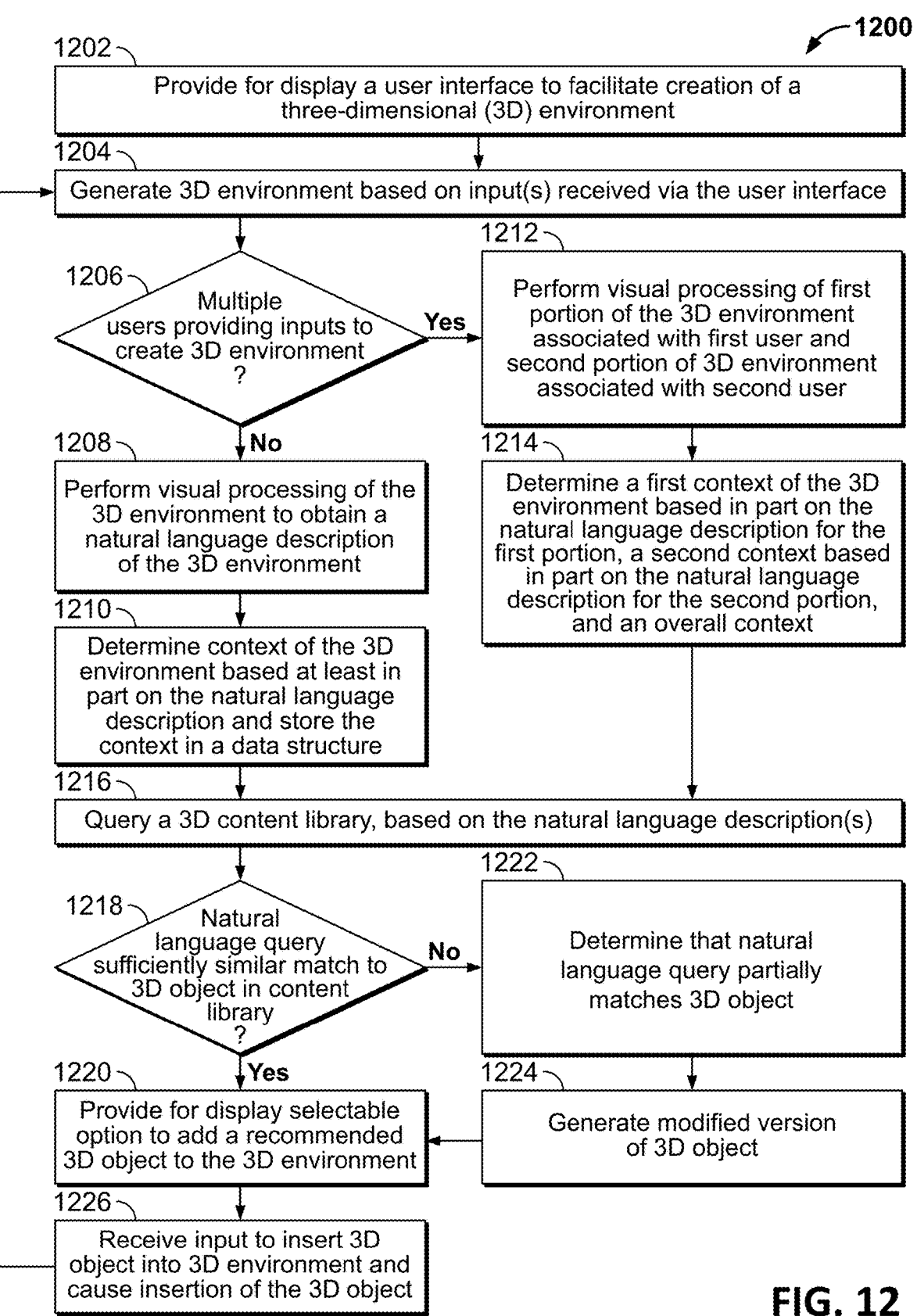

1200

1202 — Provide for display a user interface to facilitate creation of a three-dimensional (3D) environment 1204 — Generate 3D environment based on input(s) received via the user interface 1206 — Multiple users providing inputs to create 3D environment ?

Yes

1212 — Perform visual processing of first portion of the 3D environment associated with first user and second portion of 3D environment associated with second user No 1208 — Perform visual processing of the 3D environment to obtain a natural language description of the 3D environment 1214 — Determine a first context of the 3D environment based in part on the natural language description for the first portion, a second context based in part on the natural language description for the second portion, and an overall context 1210 — Determine context of the 3D environment based at least in part on the natural language description and store the context in a data structure 1216 — Query a 3D content library, based on the natural language description(s)

1218 — Natural language query sufficiently similar match to 3D object in content library ?

No

1222 — Determine that natural language query partially matches 3D object

Yes

1220 — Provide for display selectable option to add a recommended 3D object to the 3D environment 1224 — Generate modified version of 3D object 1226 — Receive input to insert 3D object into 3D environment and cause insertion of the 3D object

FIG. 12

SYSTEMS AND METHODS FOR PROVIDING SEMANTICS-BASED RECOMMENDATIONS FOR THREE-DIMENSIONAL CONTENT CREATION

BACKGROUND

This disclosure is directed to systems and methods for facilitating three-dimensional (3D) content creation. For instance, based on a determined context of a 3D environment, a recommendation to add a particular 3D object to the 3D environment may be provided.

SUMMARY

The provision of, and user interaction with, digital content, such as in relation to a user's work life, social life and/or for entertainment purposes, is increasingly likely to be immersive, e.g., occur in virtual environments, as more and more people continue to have access to immersive virtual environments through virtual reality (VR) and the metaverse.

Often, the creation of such VR or metaverse spaces is a chokepoint of content production. In one approach, a 3D artist, or world builder, sits in front of a monitor, and such user searches through a 3D asset library and selects which 3D assets to import to the engine to construct a 3D world using a two-dimensional (2D) interface. For example, the user searches the content library of choice using a search bar, browses thumbnails of objects and selects any one interesting object for a closer look, and the user subsequently decides whether to download and import the 3D asset into his or her scene.

In another approach, a designer or content creator builds a 3D world in VR, such as via a head-mounted display (HMD), such as by way of a searchable 3D library. This approach may enable a content creator to get a detailed firsthand look at the world as the content creator is building it in real time. This in turn means the content creator can quickly get a feel for things like atmosphere and scale while also being provided the opportunity to catch mistakes early in the process rather than after the scene is built. Such approach also provides the ability to manipulate the 3D assets the content creator places in the world using the VR controllers, which may offer six degrees of freedom compared to a mouse that moves over a 2D surface and can move assets only in a limited way, one or two axes at a time. In addition, in such an approach, a user has the opportunity to have digital conferences and work meetings inside the engine in real time, giving visitors and collaborators the opportunity to point to, sketch on top of, and even manipulate, objects and environments around them as the discussion progresses.

However, in such approach in which creation or 3D world-building occurs in VR, the workflow of searching, finding, selecting, and importing those 3D assets is cumbersome, in that searching for objects to add to the 3D world may require typing terms into a search field while a user is wearing an HMD facilitating the VR experience, which is difficult, time-consuming, unintuitive and tedious. For example, such interface screens and virtual screens in VR do not give the opportunity to work in flow without friction, as typing and opening 2D menus (even if 2D interfaces are introduced into the 3D environment or VR) bring the artist's focus away from the design experience and onto those search queries and menus instead. In addition, due to the overwhelming number of assets and their associated properties contained in the current and future content libraries, user input alone may not be sufficient to find the most appropriate 3D assets, as it is difficult for a user to efficiently find objects sufficiently relevant to the current 3D scene in such vast libraries. Moreover, there is a lack of tools to facilitate a cohesive design by providing relevant 3D digital objects to select from, let alone relevant 3D digital objects that are recommended based on incorporating the changes that are being made to the world in real time. There is a need for more flexible and customizable 3D content creation solutions.

To help address these problems, systems, methods, and apparatuses are disclosed herein for providing for display, via an HMD (or via another suitable device), a user interface to facilitate creation of a 3D environment, and, based on one or more inputs received via the user interface, generating the 3D environment. The disclosed techniques further enable performing visual processing of at least one portion of the 3D environment to obtain a natural language description of the at least one portion of the 3D environment, and determining a context of the 3D environment based at least in part on the natural language description. The disclosed techniques further enable storing the context in a data structure and querying a 3D content library, based on the natural language description of the 3D environment, to identify at least one recommended 3D object that is relevant to the stored context of the 3D environment. The disclosed techniques further enable providing for display, at the user interface of the HMD (or via another suitable device), one or more selectable options to add the at least one recommended 3D object to the 3D environment.

Such aspects enable providing an interactive, semantics-based recommendation system to facilitate 3D content creation by way of providing an intuitive and easy-to-use user interface to one or more users, e.g., via a user interface of an HMD, in a dynamic virtual design environment. Such interface enables 3D content to be merged and adapted into a 3D scene in the process of 3D world-building, and provides a user interface by which users building virtual environments can efficiently explore, choose and customize 3D assets. In the disclosed techniques, the 3D scene may be being created and modified by such one or more users, and provision of relevant 3D objects for insertion into the 3D environment may be based on a semantic understanding of the current 3D environment. For example, such aspects reduce the time for users to find, and increase the relevance of, candidate 3D objects for insertion into a current 3D environment, by providing 3D object recommendations relevant to a current environment, e.g., by using one or more machine learning models to generate one or more textual descriptions of the current 3D environment and using such textual descriptions to identify relevant 3D objects as insertion candidates. In some embodiments, a search field of the user interface may be automatically updated with relevant suggestions, rather than depending on the 3D artist to manually navigate through a large database of 3D objects, thereby enabling the artist to be provided with options for selecting the most relevant 3D objects directly inside the VR environment and providing for smoother 3D world-building.

The disclosed techniques include an artificial intelligence (AI)-powered world building search and recommendation pipeline for 3D assets, to enable searching and selecting more relevant 3D assets in a 3D (e.g., VR) world building scenario. Such techniques enable relevant 3D assets to be more rapidly selected and placed in the 3D scene by proposing 3D asset candidates to the world builder that are relevant to the current world and style, thereby enabling users to have more time to focus on the creation of the 3D environment, rather than spending time and effort searching through various 2D interfaces and scrolling through numerous unviable candidates. In some embodiments, the disclosed techniques permit a stand-alone 3D modeling application (e.g., in VR) to feed data to and exchange data with a game engine using an application programming interface (API), allowing a 3D world or scene to be constructed and allowing high performance over low bandwidth while the final result is streamed into a game engine scene being executed. In some embodiments, the disclosed techniques provide automated scene creation tools using a 3D asset and context provided by the user to a create a draft 3D scene that may be used as is or serve as the first version of the 3D scene for further modification by the user.

In some embodiments, at a first time, the at least one portion of the 3D environment includes a first object, the natural language description comprises a first natural language description for the first object, and the context of the 3D environment is determined based on the first natural language description. In some embodiments, the disclosed techniques enable, at a second time later than the first time, receiving an input to add a second object to the 3D environment and adding the second object to the 3D environment and obtaining a second natural language description for the second object. The disclosed techniques may further enable determining an updated context of the 3D environment based on the first natural language description and the second natural language description and storing the updated context at the data structure. The disclosed techniques may further enable querying the 3D content library, based on the first and second natural language description of the 3D environment, to identify a particular 3D object that is relevant to the stored updated context of the 3D environment, and providing for display at the user interface a recommendation to add the particular 3D object to the 3D environment.

Such disclosed techniques enable the generation of a semantic understanding of an evolving virtual world, by iteratively constructing a context (or context specification) of the current scene (e.g., including one or more objects that may be a 3D asset(s) imported by the user). For example, as a context emerges (e.g., the system iteratively converges on a specific context), the system provides the user with more and more accurate suggestions of 3D objects to be added to the virtual environment, and consequent 3D assets imported by the user may be recognized by the system and included in the current context to provide more accurate suggestions. This may enable the system, through its suggestions, to ensure a more homogeneous design by providing suggestions that fall within the current style or theme and are considered to be relevant for the context. Such a system may identify the evolving context of the virtual world while the designer or world builder is also exploring the theme style and context over numerous iterations, thereby improving collaboration and creativity of the design process while allowing the world builder to stay immersed in the creation process in the 3D virtual world.

In some embodiments, the 3D content library comprises a plurality of 3D objects and associated natural language descriptions, and the 3D environment comprises a particular 3D object of the plurality of 3D objects, and the natural language description of the 3D environment comprises a natural language description of the particular 3D object. In some embodiments, identifying the at least one recommended 3D object that is relevant to the stored context of the 3D environment is based on determining that the natural language description of the particular 3D object corresponds to the natural language description of the at least one recommended 3D object.

In some embodiments, the 3D content library comprises a plurality of 3D objects and associated metadata; the at least one portion of the 3D environment comprises a particular 3D object of the plurality of 3D objects; and determining the context of the 3D environment is further based at least in part on the metadata stored in association with the particular 3D object in the 3D content library.

In some embodiments, performing the visual processing of the at least one portion of the 3D environment to obtain a natural language description of the at least one portion of the 3D environment comprises: inputting one or more attributes of the at least one portion of the 3D environment into a machine learning model; and, receiving, as output from the machine learning model, based on the one or more attributes, the natural language description of the at least one portion of the 3D environment. In some embodiments, inputting the one or more attributes of the 3D environment into the machine learning model comprises inputting data associated with a particular 3D object of the 3D environment into the machine learning model, and the particular 3D object is present in the 3D environment prior to providing for display the at least one recommended 3D object. In some embodiments, the natural language description output by the machine learning model may comprise a natural language description of the particular 3D object.

In some embodiments, the disclosed techniques may further provide for receiving input requesting to insert a particular 3D object into the 3D environment; determining one or more attributes of the particular 3D object; determining that the one or more attributes of the particular 3D object do not match the stored context of the 3D environment; and providing for display at the user interface of the HMD (or another suitable device) an indication that the particular 3D object does not match the stored context of the 3D environment and a prompt for further input to confirm whether the particular 3D object should be inserted into the 3D environment.

In some embodiments, the at least one portion of the 3D environment includes a first portion of the 3D environment, and the method further comprises using a generative machine learning model to generate a second portion of the 3D environment based on the stored context. In some embodiments, the first portion of the 3D environment comprises a first 3D room of a structure comprising a first plurality of 3D objects, and the second portion of the 3D environment comprises a second 3D room of the structure comprising a second plurality of 3D objects.

In some embodiments, querying the 3D content library further comprises identifying the at least one recommended 3D object as a 3D object that partially matches the stored context, and the disclosed techniques may further comprise modifying the at least one recommended 3D object to cause the modified at least one 3D object to more closely match the stored context, and the one or more selectable options include an option for adding the modified at least one 3D object to the 3D environment. Such aspects may allow for evolving or modifying 3D creations or 3D assets already in the 3D content library, to provide an immersive interface for 3D world-building, to allow a user to remain in the creative flow and seamlessly insert objects modified to be more relevant to a current context, without requiring a user to pause, close out or abandon a current 3D world-building session to perform such modification using a separate computer program or other tool. In some embodiments, modifying the at least one recommended 3D object to cause the modified at least one 3D object to more closely match the stored context comprises inputting data associated with the at least one recommended 3D object into a generative machine learning model to generate the modified at least one 3D object. Such features may effectively enlarge 3D content libraries, without consuming significant storage space, and make such libraries more flexible, e.g., using AI agents that can modify and interpolate between the 3D assets already in the libraries.

In some embodiments, the disclosed techniques may further comprise receiving voice input or text input, and obtaining the natural language description is further based on the voice input or text input.

In some embodiments, the disclosed techniques may further comprise providing for display at the user interface of the HMD a prompt to confirm whether the natural language description accurately describes the context of the 3D environment, and an option to modify the natural language description In some embodiments, the disclosed techniques may further comprise determining that the 3D environment is being generated based on inputs received from a first user and a second user, and determining the context of the 3D environment is further based on a first context associated with a first portion of the 3D environment generated based on inputs received from the first user, a second context associated with a second portion of the 3D environment generated based on inputs received from the second user, and a common context associated with the inputs received from the first user and the inputs received from the second user.

In some embodiments, the disclosed techniques may track a plurality of inputs received via the user interface in relation to the 3D environment, and store indications of the plurality of received inputs at the data structure. The disclosed techniques may determine the context of the 3D environment further based on analyzing the stored indications of the plurality of received inputs, and provide for display a plurality of recommended 3D objects relevant to a stored current context of the 3D environment, including providing a first recommended 3D object at a first time, and, based on the stored indications of the plurality of received inputs, preventing display of the first recommended 3D object at a second time later than the first time, and instead providing a second recommended 3D object that is more similar to the current context.

In some embodiments, the disclosed techniques may determine a plurality of spatial relationships between a plurality of 3D objects of the 3D environment. In some embodiments, the data structure is a graph data structure comprising a plurality of nodes and a plurality of edges between the plurality of nodes, the plurality of nodes corresponding to the plurality of 3D objects of the 3D environment and characteristics of the plurality of 3D objects, and the plurality of edges corresponding to the plurality of spatial relationships between the plurality of 3D objects. In some embodiments, determining the context of the 3D environment is based at least in part on the plurality of nodes and the plurality of edges of the graph data structure.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4 shows an illustrative dialogue between a user and the system, in accordance with some embodiments of this disclosure.

FIG. 12 is a flowchart of a detailed illustrative process for providing recommended 3D objects for a 3D environment, in accordance with some embodiments of this disclosure.

DETAILED DESCRIPTION

Figure 1A:
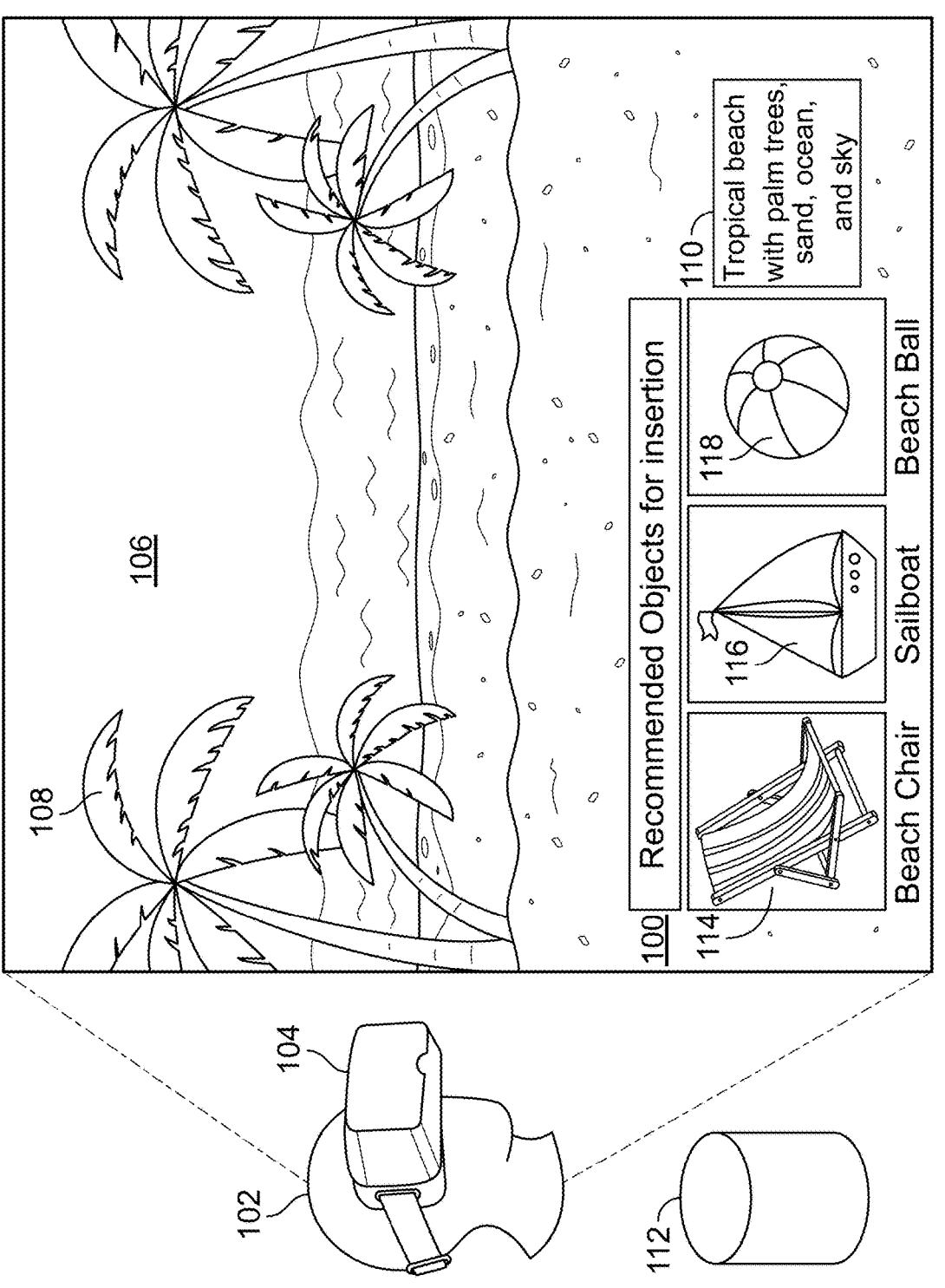
FIGS. 1A-1C show illustrative user interfaces to facilitate creation of a three-dimensional (3D) digital environment, in accordance with some embodiments of this disclosure.

FIG. 1A shows an illustrative user interface 100 to facilitate creation of a three-dimensional (3D) digital environment, in accordance with some embodiments of this disclosure. As shown in FIG. 1A, a 3D environment creation system (referred to below as "the system") may provide for display, at computing device 104, user interface 100 to facilitate creation of 3D digital environment 106 by user 102. In some embodiments, user 102 may be a 3D world designer or 3D content creator that is using, wearing and/or otherwise operating or associated with computing device 104. As shown in FIG. 1A, computing device 104 may be an extended reality (XR) head-mounted display (HMD). In some embodiments, computing device 104 may comprise or correspond to a headset; a mobile device such as, for example, a smartphone or tablet; a laptop computer; a personal computer; a desktop computer; a smart television; a smart watch or wearable device; smart glasses; a stereoscopic display; a wearable camera; XR glasses; XR goggles; a near-eye display device; or any other suitable user equipment or computing device; or any combination thereof.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

In some embodiments, the system may comprise or correspond to a 3D environment creation application, which may be executed at least in part on computing device 104 and/or at one or more remote servers (e.g., server 1102 of FIG. 11) and/or at or distributed across any of one or more other suitable computing devices, in communication over any suitable number and/or types of networks (e.g., the Internet). The 3D environment creation application may be configured to perform the functionalities (or any suitable portion of the functionalities) described herein. In some embodiments, the 3D environment creation application; and/or the system may be a stand-alone application, or may be incorporated as part of any suitable application or system, e.g., a 3D world-building or 3D modeling application; a video game application; a video game creation or editing application; a content creation and/or content editing application; a collaborative design tool; a metaverse building tool; a palette approach; asset placement tools in game engines; procedural asset placement; a content provider application, an XR application; a social networking application; a content acquisition, recognition and/or processing application; a machine learning model or AI system; or any other suitable application or system; or any combination thereof; and/or may comprise or employ any suitable number of displays; sensors or devices such as those described in FIGS. 1-12; or any other suitable software and/or hardware components; or any combination thereof. In some embodiments, the techniques described herein can be employed in connection with 2D content creation (e.g., a 2D scene in a game engine), in addition to 3D content creation described herein.

In some embodiments, the 3D environment creation application may be installed at or otherwise provided to a particular computing device, may be provided via an API, or may be provided as an add-on application to another platform or application. In some embodiments, software tools (e.g., one or more software development kits, or SDKs) may be provided to any suitable party, to enable the party to implement the functionalities described herein.

As shown in FIG. 1A, the system may receive one or more inputs to generate 3D environment 106, which may correspond to a beach scene, interior and/or exterior of a building, or any other suitable scene, or any combination thereof. In some embodiments, 3D environment 106 may correspond to an XR environment; a video game development or video game editing or video game environment; 3D asset marketplaces or libraries having 3D assets (e.g., characters with functionality animation) any other suitable content creation environment; or any combination thereof. In some embodiments, 3D environment 106 may initially be an empty or blank space, and the system may receive one or more inputs (e.g., via voice input, via a remote or hand controller, via tactile or touchscreen input, via biometric input, or via any other suitable user interface modality, or any combination thereof) to insert 3D digital objects (also referred to herein as 3D objects, 3D assets, or 3D models) into 3D environment 106. The 3D digital object may comprise various attributes, e.g., texture, surface material and/or any other suitable attributes, and may be accessible via any suitable source, e.g., a 3D content library. The 3D digital object may be movable and placeable in the 3D environment, e.g., based on input received from one or more users 102, as part of creating a virtual world. It should be noted that "based on" and "based at least in part on" are used interchangeably herein, and that as used herein, performing a particular action or function (or obtaining an attribute or result) "based on" or "based at least in part on" particular criterion is not intended to limit such action, function, attribute, or result to be performed or obtained solely on the basis of such particular criterion.

In some embodiments, the system may enable user 102 to search and browse through one or more content libraries to import and/or select different 3D objects or 3D assets for insertion in 3D environment 106. In the example of FIG. 1A, the system may receive an input request from user 102 to insert or import palm trees 108, or a request to insert a generic beach template. In some embodiments, the system may receive the one or more inputs to generate 3D environment 106 as part of user 102 creating a 3D scene in a VR content creation environment, e.g., a stand-alone scene or a level or room in a larger experience where different 3D assets may be imported, and their behavior may be programmed visually.

In some embodiments, the system may be configured to employ any suitable computer-implemented technique (e.g., one or more machine learning models, and/or heuristic techniques) to perform visual processing (e.g., object recognition, shown at 202 of FIG. 2, of one or more 3D objects or 3D assets in a current scene) of 3D environment 106 to obtain a natural language description 110 (e.g., "Tropical beach with palm trees, sand, ocean and sky") of 3D environment 106. Natural language description 110 may describe 3D environment 106 as a whole, and/or any suitable portion(s) or subset(s) thereof, and/or may describe one or more 3D objects or assets present in 3D environment 106. In some embodiments, natural language description 110 may be stored in data structure 112 (e.g., a database, a knowledge graph or other graph data structure, a semantic map, or any other suitable data structure, or any combination thereof). In some embodiments, multiple natural language descriptions may be obtained for 3D environment 106 and stored in data structure 112. As a non-limiting example, in FIG. 1A, natural language description 110 of 3D environment 106 may be "Beach with palm trees, sand, ocean, and sky." In some embodiments, natural language description 110 may be generated based on traversing nodes of a semantic graph (e.g., stored at data structure 112) and/or other attributes describing the current scene. In some embodiments, semantics, or semantic understanding, of a 3D scene may include, but is not limited to, the 3D objects' classification within the scene; their location, scale and relationships; and other defining characteristics such as textures, materials, polygon distribution; and/or any other suitable data.

In some embodiments, during a user session, the system may generate, for various fields of view (FOV) of computing device 104 and/or user 102, different natural language descriptions. For example, one or more natural language descriptions may be specific to a particular FOV of 3D environment 106, e.g., different descriptions based on different vantage points and FOVs. As an example, if palm trees are excluded from a first FOV, the natural language description for such first FOV may not include a reference to palm trees 108; on the other hand, a second FOV in the same environment may include palm trees 108, and thus the system may generate a natural language description for such second FOV that references palm trees 108. In some embodiments, candidate 3D objects recommended to user 102 may be determined based at least in part on the current FOV's natural language description corresponding to metadata of the candidate 3D object. In some embodiments, a context of the 3D environment (which may be determined based at least in part on one of more natural language descriptions of the 3D environment) the can be a context for the 3D environment as a whole (or a FOV thereof), or can be specific to particular portions of the environment, e.g., a foreground, background, below or above a horizon line, based on a particular FOV or vantage point, or based on any other suitable criterion, or any combination thereof.

In some embodiments, the visual processing may include performing image segmentation (e.g., semantic segmentation and/or instance segmentation) on one or more portions of 3D environment 106 to identify, localize, distinguish, and/or extract the different 3D objects, and/or different types or classes of 3D objects, or portions thereof. For example, such segmentation techniques may include determining which pixels (or voxels) in the image belong to a particular object. Any suitable number or types of techniques may be used to perform such segmentation, such as, for example: machine learning; computer vision; object recognition; pattern recognition; facial recognition; image processing; image segmentation; edge detection; color pattern recognition; partial linear filtering, regression algorithms; and/or neural network pattern recognition; or any other suitable technique; or any combination thereof. In some embodiments, objects may be identified by extracting one or more features for a particular object, and comparing the extracted features to those stored locally and/or at a database or server storing features of objects and corresponding classifications of known objects.

In some embodiments, the system may determine, based at least in part on natural language description 110, a context (or context specification) of 3D environment 106. In some embodiments, an indication of a current context (and/or past contexts) for 3D environment 106 may be stored at data structure 112. In some embodiments, the context may be defined as one or more natural language descriptions of the current version (and/or previous versions) of a scene in the 3D environment, and/or one or more natural language descriptions of 3D objects or assets within the 3D environment. For example, the context may be defined at least in part based on categories, labels, keywords, styles, size, placement, any other suitable defining features, or any suitable combination thereof, of 3D objects in 3D environment 106 and/or of other portions of the 3D environment. In some embodiments, 3D environment 106 may be associated with a single context, or multiple different contexts, e.g., a different context for multiple different portions of the 3D environment.

In some embodiments, the context may correspond to a single natural language description for the 3D environment, or multiple natural language descriptions associated with the 3D environment (e.g., stored at data structure 112) may be merged to determine the context for the 3D environment. In some embodiments, the multiple natural language descriptions may be weighted equally when merging the multiple natural language descriptions to determine the context, or certain natural language descriptions may be weighted more heavily than others. For example, the system may determine that a natural language description for a 3D object having certain characteristics should contribute more to the overall context of 3D environment 106 than other objects in 3D environment 106. For example, such a characteristic may be that the 3D object was most recently inserted into 3D environment 106 relative to other objects in the 3D environment; is currently in a FOV of computing device 104; is currently more clearly visible or is more fully depicted than other objects in the 3D environment; is larger in size, or positioned more prominently (e.g., in a foreground) in the 3D environment, relative to other objects (e.g., which may be smaller or in the background) in the 3D environment; matches preferences indicated in a user profile of user 102 more closely than other 3D object in the 3D environment; or based on any other suitable characteristic, or any combination thereof). In some embodiments, metadata associated with inserted objects may be stored in a 3D content library (e.g., at data structure 112 or at any other suitable data store), and the system may determine a context of the 3D environment based at least in part on the metadata. Such metadata may have been assigned by an editor to a particular 3D object or may be automatically generated, e.g., by a machine learning model. In some embodiments, the context may be determined based at least in part on user inputs received by the system, e.g., keyword searches and/or browsing, and/or subsequent object selections.

Figure 2:
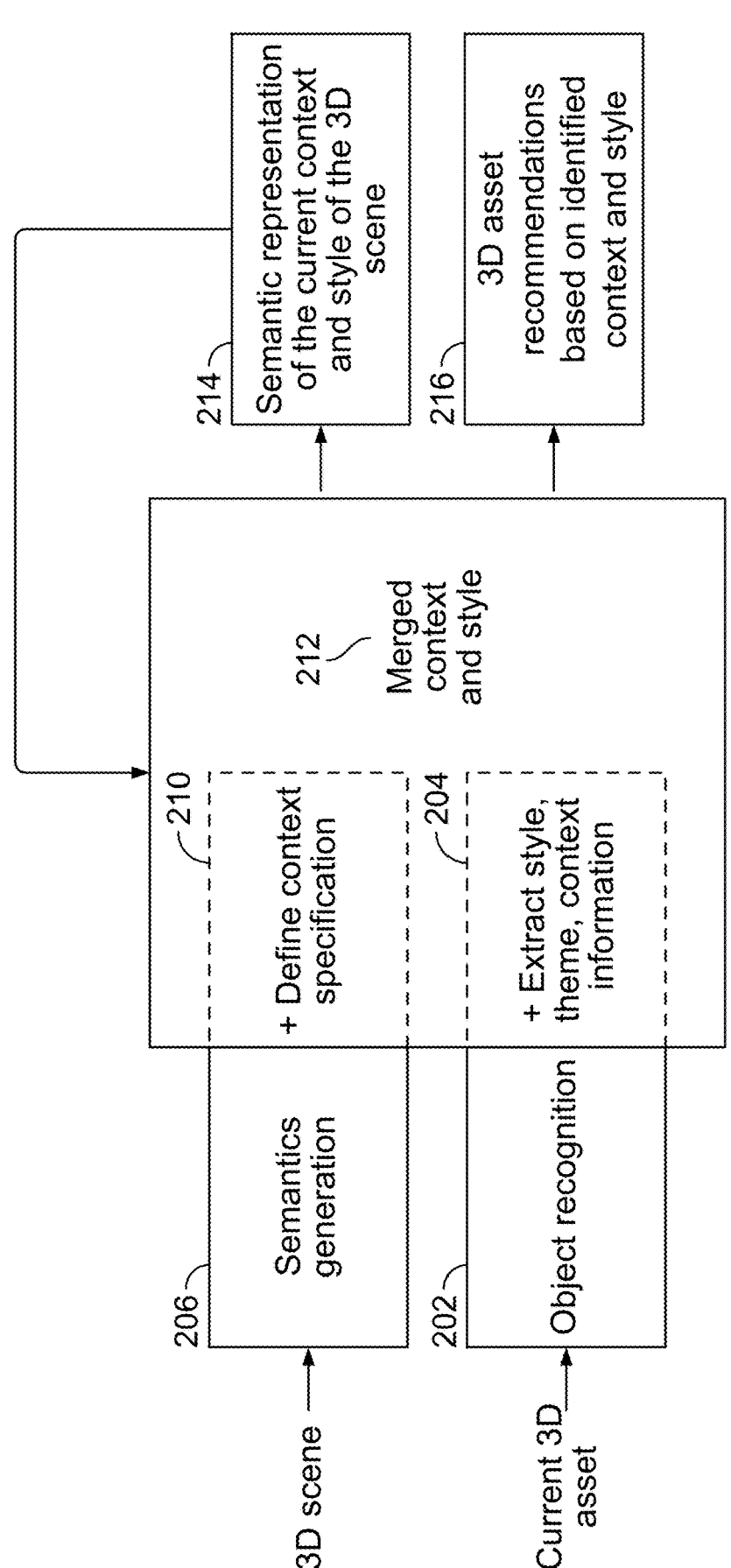
FIG. 2 shows an illustrative block diagram for providing 3D asset or 3D object recommendations, in accordance with some embodiments of this disclosure.

In some embodiments, the system may determine or define the context or context specification (as shown at 210 of FIG. 2) of the 3D environment (which may have been created based on one or more previous user inputs and/or a current user input) by generating a semantic representation or semantic understanding (as shown at 214 of FIG. 2) of the current context and/or style of the 3D scene, to support creation of the 3D scenes by understanding what the user(s) is trying to create. The term "semantic" may be understood as referring to the domain of computer vision and image processing, where it pertains to the understanding and interpretation of visual content, such as, for example, images or environments. The system may determine the semantics based on the extraction of meaningful information from visual data (e.g., extracting style, theme, and/or context information at 204), which may include pixel-level (or voxel-level) analysis of the visual data, and/or may go beyond such pixel-level (or voxel-level) analysis. For example, the system may employ any suitable computer-implemented techniques to identify 3D objects, recognize their attributes, discern relationships between objects in the 3D environment, and comprehend the overall scene. In some embodiments, the system may be configured to understand and interpret the meaning of objects and elements within the 3D environment and assign significance to 3D objects and their properties. In some embodiments, as shown in FIG. 2, an overall context 212 of a 3D scene may be determined based on a merged style, theme and context information (and/or any other suitable data) extracted from one or more objects in the 3D environment, merged with context specification 210, and recommending 3D assets or objects based on the identified context and/or style (as shown at 216) of one or more of the 3D objects in 3D environment 106.

In some embodiments, the system generates the semantics (as shown at 206 of FIG. 2) of such 3D environment 106 dynamically by using computer-implemented techniques, e.g., semantic scene understanding and/or machine learning techniques, to merge a user's input with the current scene and establishing a context, thereby enabling recommendations to add one or more 3D assets to 3D environment 106, and/or replace one or more 3D assets currently in 3D environment 106 with different 3D assets (e.g., recommended based on more closely matching the context of 3D environment 106). Such techniques for semantic scene understanding and/or machine learning techniques are discussed in more detail in Wald et al., "Learning 3D Semantic Graphs from 3D Indoor Reconstructions," 2020 IEEE/CVF Conference on Computer Vision and Pattern Recognition (CVPR), and Aylagas et al., "Reconstruction and recommendation of realistic 3D models using cGANs," Degree Project in Computer Science and Engineering, Stockholm Sweden 2018, Kth Royal Institute of Technology, the disclosures of each of which are hereby incorporated by reference herein in their entireties.

In some embodiments, the system may store such determined context in data structure 112, and the system may use the determined context to query a 3D content library (e.g., stored at data structure 112 or any other suitable data store). For example, the system may extract metadata and/or any other suitable data from the current context (e.g., determined based on the generated natural language description or prompt 110 and/or based on any other suitable data associated with 3D environment 106 and/or user 102) to search one or more 3D content libraries for relevant 3D assets, e.g., relevant to the determined context and/or natural language description 110 of 3D environment 106. In some embodiments, each of the 3D objects in a particular 3D content library may be associated with a natural language description or other suitable metadata.

For example, 3D content library 112 may include a wide variety of different 3D objects, one or more of which may be candidates for insertion, and the system may identify objects 114, 116, and 118 from among the 3D objects in the 3D content library, based on metadata (e.g., "beach chair," "sailboat," and "beach ball" corresponding to recommended objects 114, 116, and 118, respectively), as relevant to the current context of 3D environment 106 due to the similarity between such metadata of objects 114, 116, and 118 and the current context (e.g., defined based on natural language description 110 of "beach with palm trees, sand, ocean, and sky"). The system may use any suitable computer-implemented techniques to identify such recommended 3D objects 114, 116, and 118 as relevant to the current context, e.g., querying the 3D content library to determine that at least a threshold number of words, phrases or symbols in natural language description 110 match metadata of objects 114, 116, and 118; using natural language processing techniques and/or machine learning techniques to determine whether a similarity score and/or relatedness of words (e.g., synonyms or any other suitable parts of speech or otherwise related terms) as between the context and the metadata exceeds a threshold value, or using any other suitable techniques, or any combination thereof. In some embodiments, relevancy of a candidate 3D object in a 3D content library may be based at least in part on preferences indicated in a user profile of user 102. In some embodiments, recommended objects 114, 116, and 118 may be presented at user interface 100 automatically or by default, or based on receiving a request (e.g., via user interface 100) from user 102 for recommended objects.

In some embodiments, 3D content library 112 or 3D content data structure may categorize 3D objects into any number of different contexts (at different levels of granularity), e.g., relevant to a beach scene, have been used by this user 102 or similar users having similar preferences or interaction history, relevant to a fantasy game, are pieces of furniture, or based on any other suitable criterion, or any combination thereof. In some embodiments, the system may refine such 3D content library 112 or 3D content data structure over time, based on usage of 3D objects in association with different contexts.

In some embodiments, a position of recommended 3D objects 114, 116, and/or 118 at user interface 100 may be based at least in part on a relevancy score in relation to the current context of the 3D environment. For example, a beach chair may be considered more relevant to the current context than the other recommended objects, based on a comparison of metadata of beach chair 114 to the current context, and/or based on prior selections of user 102 when building a 3D environment via the system and/or popularity of selected objects by other users of the system. Based on this determination, recommended object 114 may be ranked higher than the other recommended objects 116 and 118 and placed in a more prominent position of user interface 100 (e.g., as the first object from left to right, or in a gaze of the user, or at any other suitable position).

The system may receive input from user 102 (or may automatically insert) of one or more of recommended objects 114, 116, or 118 into 3D environment 106. For example, the system may receive, interpret, and perform an action based on a voice input from user 102 of "Put the beach chair on the sand," or "Put the sailboat in the water." As another example, the system may monitor the gaze of user 102 via computing device 104, and may place a recommended object at a location that the user is gazing at in 3D environment 106, e.g., based on receiving voice input of "Place the beach ball where I am looking," or any other suitable input. As another example, the system may receive, via user interface 100, a drag and drop input, or any other suitable input, to place one or more of recommended objects 114, 116, or 118 into a particular portion of 3D environment 106. In some embodiments, recommended objects 114, 116, and 118 (and/or any other suitable number or type of recommended objects relevant to the context of 3D environment 106) may be positioned at any suitable portion of user interface 100, e.g., overlapping the depiction of 3D environment 106. In some embodiments, an option may be provided via user interface 100 to enable user 102 to search through one or more 3D content libraries for candidate 3D objects for insertion into 3D environment 106.

In some embodiments, a recommendation engine of the system can take into account user feedback received (or not received) via user interface 100. For example, the natural language representation of the current context constructed by the system may, in addition to enabling search of relevant 3D assets from 3D asset libraries, also support dialog between the system and user 102 by communicating and confirming the understood design intent and context. For example, user interface 100 may provide for display a prompt indicating whether the context (e.g., indicated at natural language description 110) is accurate with respect to the current 3D environment 106, and/or whether the recommended objects are suitable for the given 3D environment, and/or user interface 100 may allow user 102 to edit natural language description 110 to clarify what the context should be for the current 3D environment 106. In some embodiments, such feedback may be used by the system to, e.g., recalibrate parameters of one or more machine learning models to take into account such received feedback.

Figure 1B:
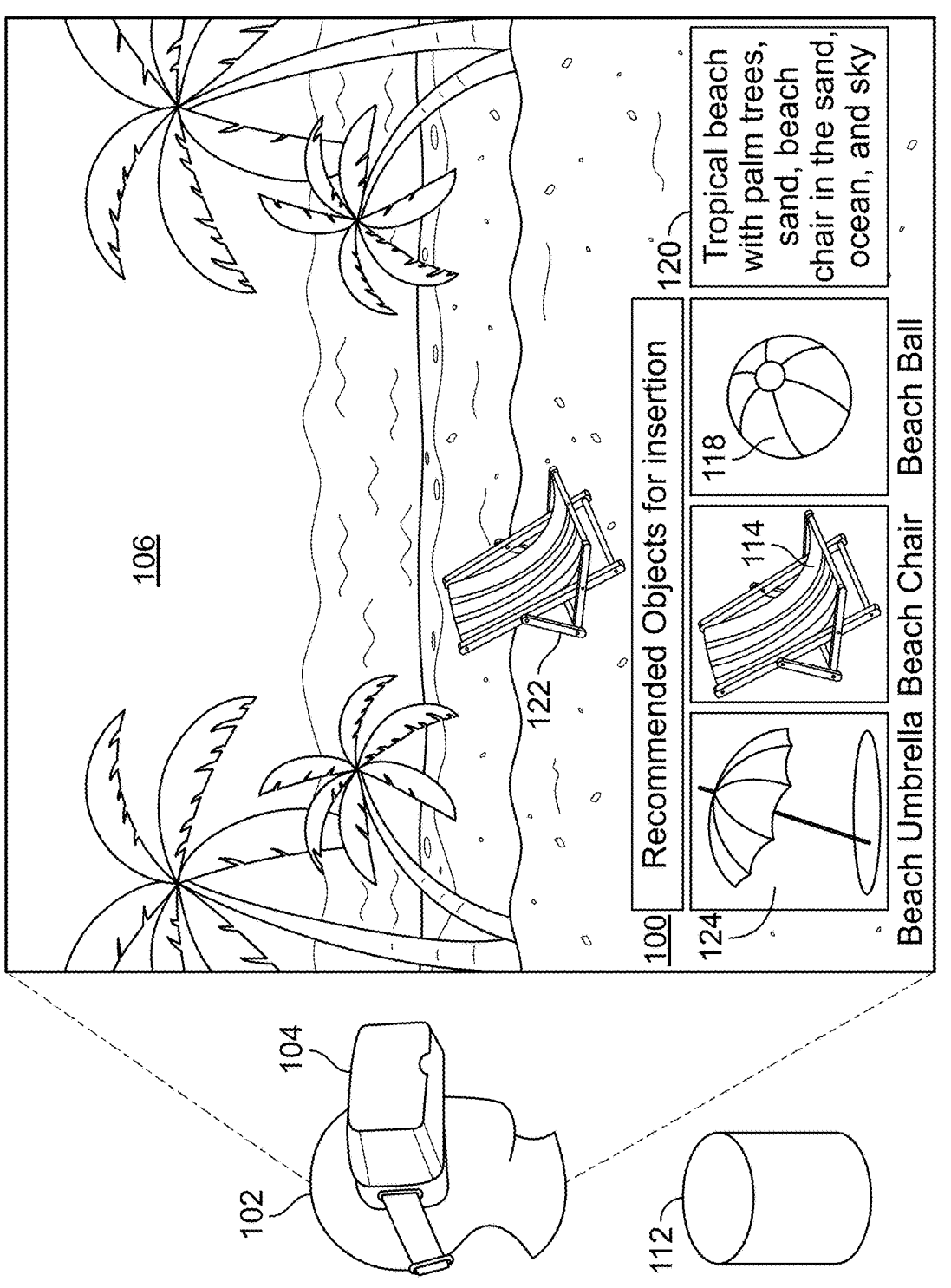

As shown in FIG. 1B, the system may automatically (or based on user input received via user interface 100) insert recommended object 114 into 3D environment 106, to cause 3D environment 106 to include beach chair 122 (corresponding to recommended object 114). Based on the inclusion of beach chair 122 in 3D environment 106, the system may generate an updated natural language description 120 (e.g., tropical beach with palm trees, sand, beach chair in the sand, ocean, and sky") for 3D environment 106 (and/or any suitable portion(s) thereof). For example, based on the insertion of 3D environment 106, the text "beach chair in the sand" may be added to natural language description 110 of FIG. 1A, to form natural language description 120 of FIG. 1B, e.g., the system may provide user 102 with visual interactive feedback when the system recognizes 3D asset 122 (selected or imported from a 3D asset library) in the overall context. Thus, the system may iteratively construct a context (or context specification) by generating a semantic understanding of the current scene and 3D object(s) that may be selected for insertion into 3D environment 106.

For example, when a 3D asset is imported into the scene, the system may analyze such input of the 3D asset into the scene, this together with the existing overall scene, to define the context or semantic understanding. Such analysis and defining of an updated context may be performed continuously with every change the user makes to the scene, and/or can utilize text and/or voice input received from user 102 to modify the context and/or update the context. While at an early stage of the design of a 3D environment, it may be more difficult to accurately identify the context due the lack of 3D objects or scenery present in the environment, the context may be determined relatively quickly based on each of the properties that can be extracted and utilized from the current scene and 3D assets. For example, the system may identify and provide for display a number of initial candidates for the current context, which may be filtered out as the design of the 3D environment progresses and converges into a more discernable context. Thus, as the context emerges, e.g., the system iteratively converges on a specific context, users may receive more accurate or more relevant recommended 3D objects or assets for insertion. In some embodiments, consequent 3D assets imported by the user may be recognized by the system and included in the current context to provide more accurate suggestions. Such features may ensure a homogeneous design of the 3D environment by providing suggestions that fall within the current style or theme and are considered to be relevant for the context.

As shown in FIG. 1B, based on the updated context (e.g., determined based at least in part on natural language description 120), the system may identify one or more new candidate recommended objects for insertion, relative to the recommended objects for insertion in FIG. 1A. For example, the system may recommend object 124, a beach umbrella, for insertion, based at least in part on beach umbrella 124 being a land-based object, e.g., similar to beach chair 122, and may similarly recommend another beach chair 114 for insertion and/or beach ball 118. In some embodiments, previously recommended objects may be removed based on the update context. For example, sailboat 116 may be removed as a recommended object for insertion since a sailboat is typically placed in the water, and the recently selected beach chair 122 may bias the system towards other objects more typically placed on land. In some embodiments, recommended objects 124, 114, and 118 may be ranked based on a predicted likelihood of insertion, e.g., based on the updated context and/or user preferences of historical selections of user 102 and/or other users.

Figure 1C:
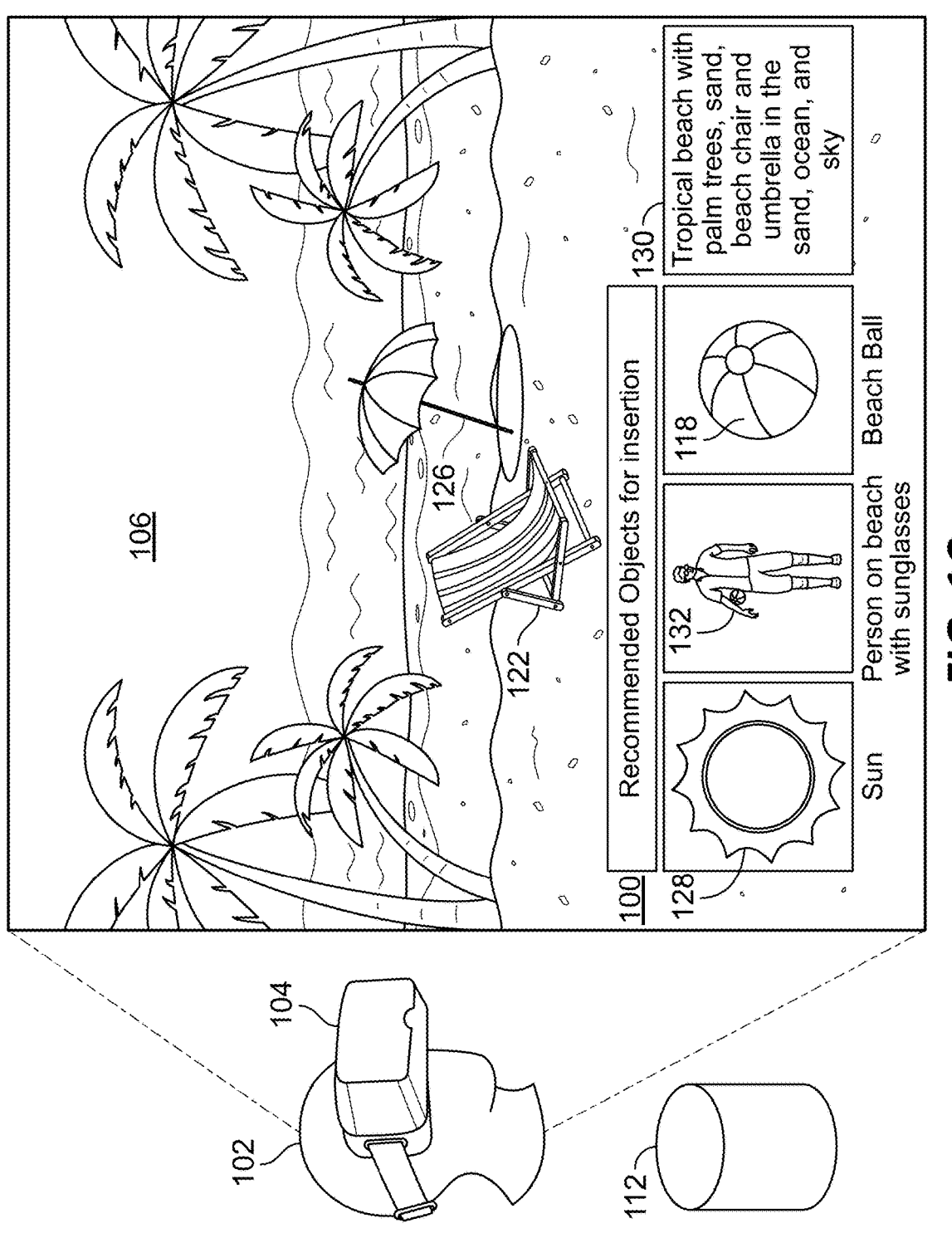

As shown in FIG. 1C, the system, having received selection of (or automatically inserted) the recommended object of beach umbrella 114 into 3D environment 106, may cause object 126 corresponding to the recommended object 124 to be inserted in environment 106. Based on insertion of beach umbrella 126, the system may generate further updated natural language description 130 (e.g., "Tropical beach with palm trees, sand, beach chair, and umbrella in the sand, ocean, and sky) to include "umbrella in the sand" as compared to the prior natural language description 120 of FIG. 1B, and may in turn update the context stored at data structure 112 based on such further updated natural language description 130. In some embodiments, the system may identify recommended objects relevant to such updated context, e.g., sun 128 and person on beach with sunglasses 132. For example, metadata of the inserted umbrella 126 may be associated with (e.g., by a manual editor or using computer-implemented techniques) tags such as, for example, "sun," "sunglasses," "rain" and/or any other terms relevant to the usage or otherwise associated with umbrellas. The system may determine that objects 128 and 132 are associated with metadata having one or more common terms with such metadata of umbrella 126, e.g., based on the term "sun" being associated with object 128 or "sunglasses" being associated with object 132 matching metadata of umbrella 126.

In some embodiments, the system may employ one or more search algorithms (which may consider keyword relevance, object category, material type, and/or other relevant criterion) that query a 3D content library with the stored context and/or natural language description 130 to match it against the tagged metadata of the 3D objects in the 3D content library. The system may sort and rank the results based on relevance, e.g., objects that closely match the query criteria may be presented first, making it easier for user 102 to find the most relevant recommended objects, to create a more seamless experience of obtaining a desired 3D asset, without the user having to explicitly request such 3D asset. In some embodiments, the context of environment 106 may be based at least in part on, e.g., properties of objects in the 3D scene determined via image processing, such as, for example, polygonal and surface data, material information, tags, AI description, or any other suitable properties, or any combination thereof. In some embodiments, the context of 3D environment 106 may be based at least in part on objects selected by (e.g., in a current session or a historical session) multiple users interacting in, and/or simultaneously working on, building 3D environment 106.

Figure 3:
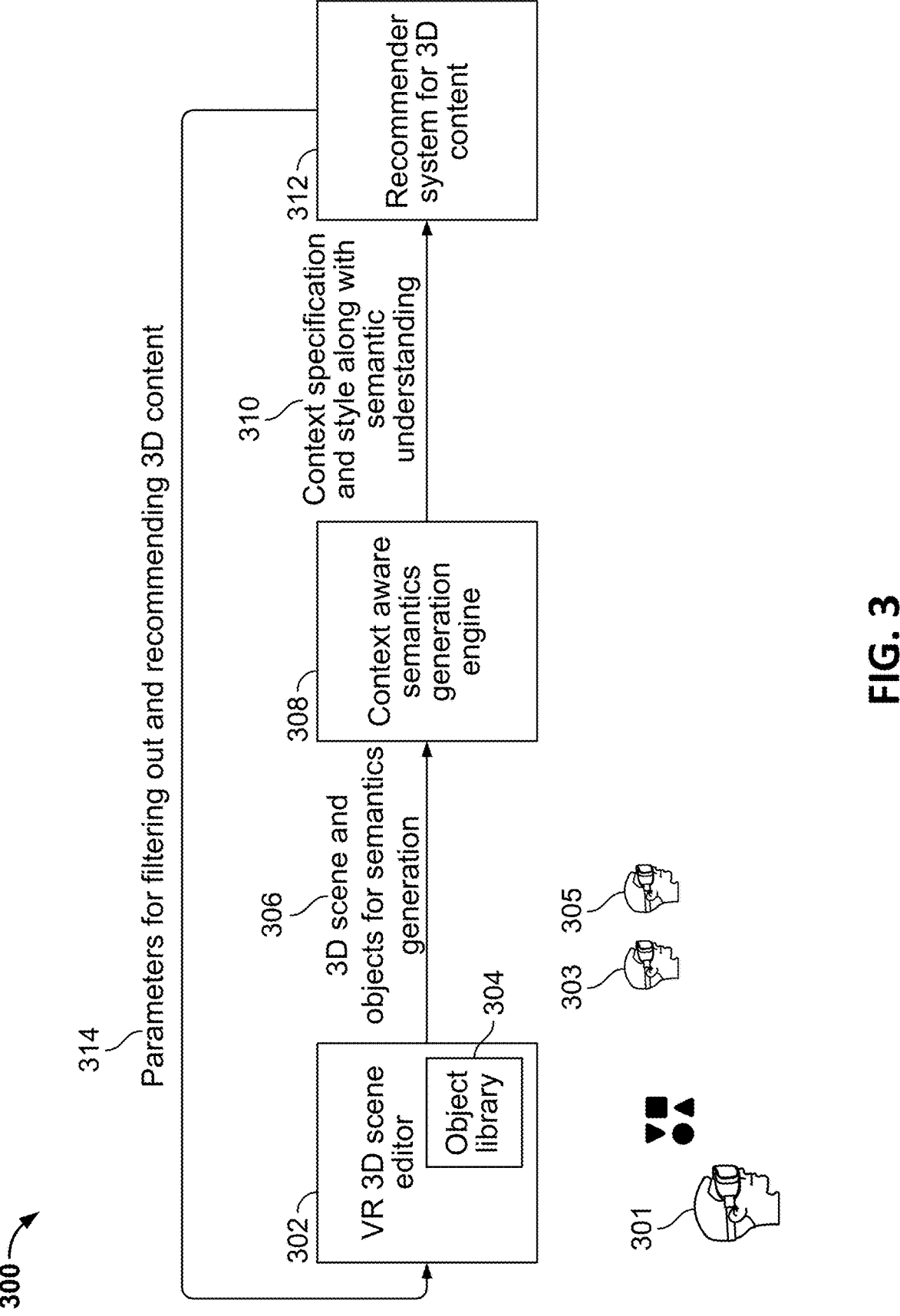
FIG. 3 shows an illustrative block diagram for providing 3D asset or 3D object recommendations, in accordance with some embodiments of this disclosure.

FIG. 3 shows a block diagram 300 for providing recommended objects for insertion into a 3D environment, in accordance with some embodiments of this disclosure. In some embodiments, the system may comprise a VR 3D scene editor 302 having a 3D content (or 3D object) library 304. For example, a single user 301 may build a 3D world using objects from 3D content library 304, or multiple users 303 and 305 may simultaneously build a 3D world using objects from 3D content library 304. At 306, based on the 3D scene and objects therein, the system may perform semantics generation, e.g., via context-aware semantic generation engine 308, to identify context specification 310 and/or a style of one or more objects in the 3D environment, along with a semantic understanding of the 3D environment. At 312, the system may employ a recommender system for 3D content, which may recommend candidate objects for insertion based on the current context specification (and/or style) and semantic understanding determined at 310 and input to the recommender 312. As shown at 314, the system may utilize parameters to filter out irrelevant 3D assets and recommend suitable 3D assets for the user(s) to import into the 3D scene.

FIG. 4 shows an illustrative dialogue between user 402 (e.g., user 102 of FIGS. 1A-1C and/or a camera and/or a virtual camera) and system 404 (e.g., the 3D environment creation system) in accordance with some embodiments of this disclosure. Queries, 406, 410, 414, and 418, and responses 408, 412, 416, and 420 may each be part of an ongoing dialogue between user 402 and system 404, where each subsequent query and/or response may be based on a previously received query and/or response. For example, the system may receive from user 402 a query 406 of "Tell me what you see," and the system may use a semantic understanding of the current 3D scene to provide response 408 (e.g., "A room of chairs and table in a lounge or tea setting in the décor of 16th century England") to user 402, to facilitate a dialog around the design process. Response 408 may be a natural language description (and/or indication of a context) of the current 3D environment or one or more portions thereof, and may be provided in a visual form, textual form, audio form, and/or any other suitable form. In some embodiments, the system may provide for display, or for other output, an option for user 402 to confirm the accuracy of response 408, reject the accuracy of response 408, and/or edit the accuracy of response 408, and the system may be provided with such feedback to update the current natural language description and fine-tune future natural language descriptions and semantic understandings of similar scenes.

In some embodiments, query 410 (e.g., "What would be another asset reasonable to import here?") may be received by the system from user 402 to request a recommendation for a current 3D scene. For example, recommended objects, and/or natural language response 412 (e.g., "A room like this ought to have walls with fine wood carved details and a chandelier. I can propose some for you"), may be presented to the user based on such query 410. Query 414 (e.g., "Yes please, give me two proposals for each") received by the system from user 402 may be a follow-up to response 412, where query 414 may comprise a request (e.g., received via voice input, text input, and/or via any other suitable input) for multiple 3D object recommendations, and the system may output such 3D object recommendations and/or natural description 416 (e.g., "Expanding the detailed description of the search for the library API and sorting out 2 wall décor pieces and 2 chandeliers and presenting them for the user") associated with the 3D object recommendations. The system may receive follow-up query 418 (e.g., "I like chandelier 1 [which may cause the system to place such chandelier in the 3D scene] but not the wall décor. The first décor feels the closest, research using that as weight" from user 402, in which the user indicates which 3D recommended object he or she would like to be inserted into the 3D environment, and/or may receive input requesting to modify a natural language description for one or more of the 3D objects and/or may receive input requesting certain 3D objects to be more heavily weighted when providing recommendations in future similar situations. The system may output response 420 (e.g., "Searching candidates and expanding the detailed description to closer match décor piece 1 and propose 3 new ones") in reply to query 418.

Figure 5:
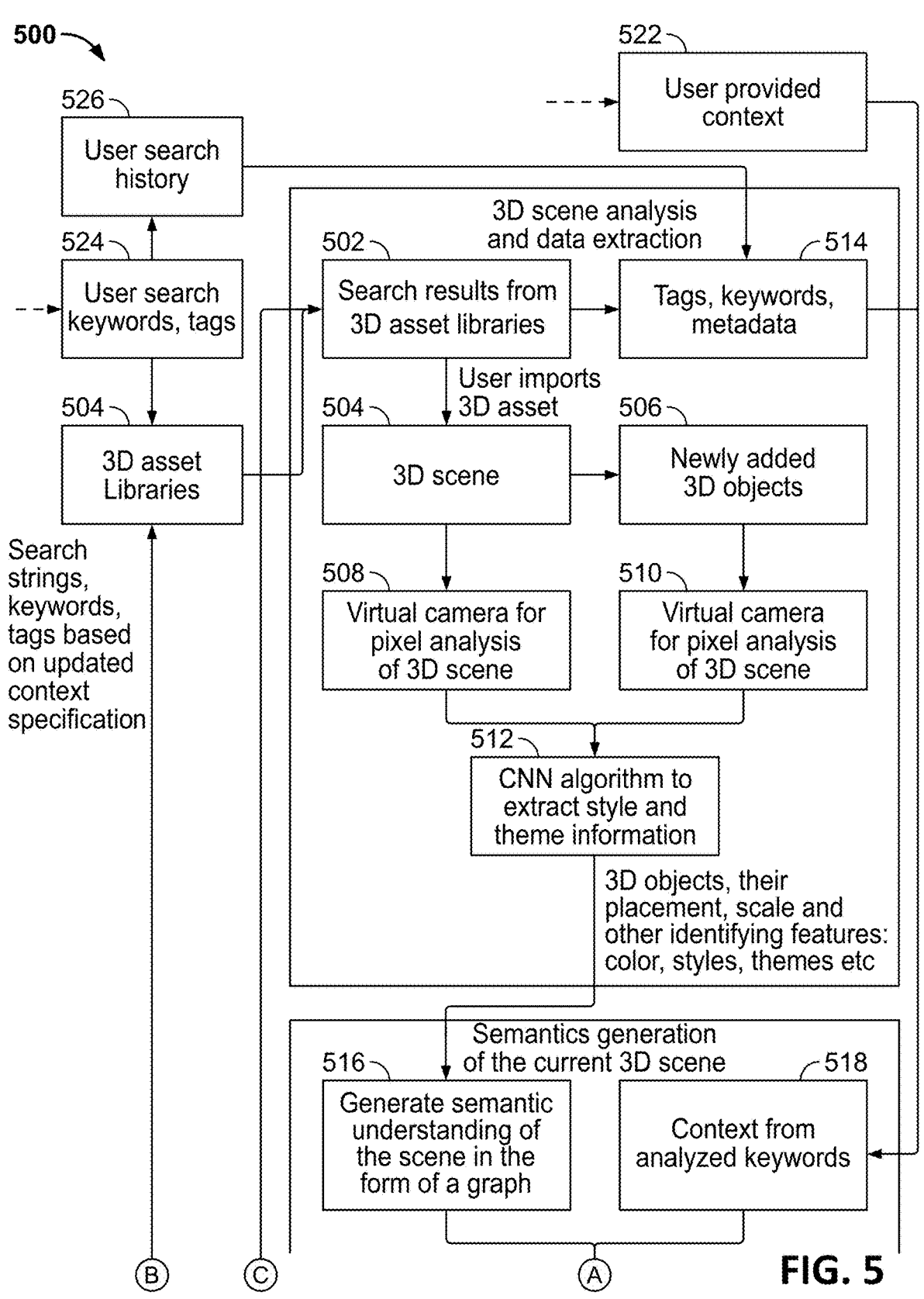
FIG. 5 is a flowchart of an illustrative process for providing recommended 3D objects for a 3D environment, in accordance with some embodiments of this disclosure.
Figure 5:
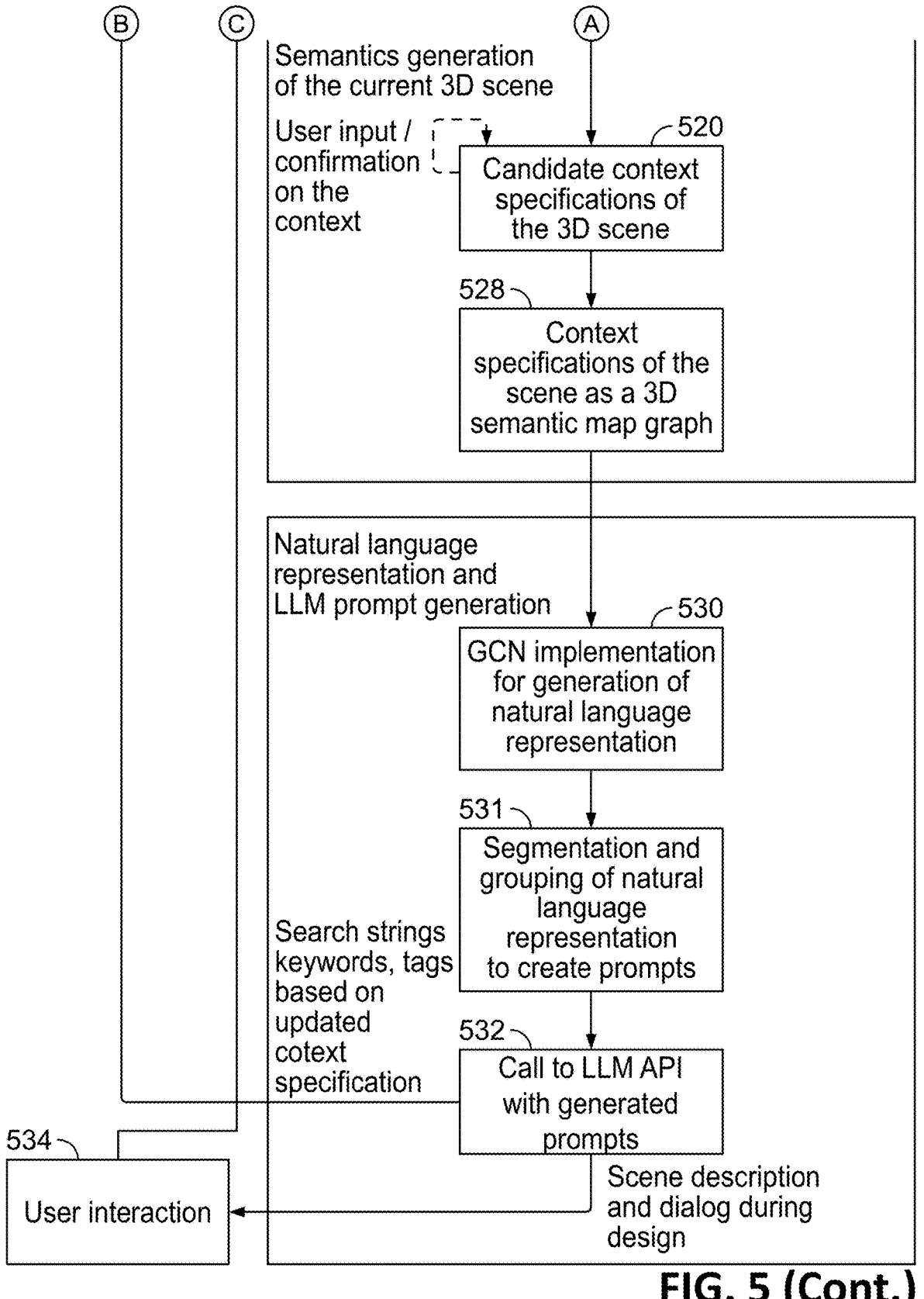

FIG. 5 is a flowchart of an illustrative process 500 for providing recommended 3D objects for a 3D environment, in accordance with some embodiments of this disclosure. In various embodiments, the individual steps of process 500 may be implemented by one or more components of the devices, methods, and systems of FIGS. 1-4 and 6-12 and may be performed in combination with any of the other processes and aspects described herein. Although the present disclosure may describe certain steps of process 500 (and of other processes described herein) as being implemented by certain components of the devices, methods, and systems of FIGS. 1-4 and 6-12, this is for purposes of illustration only, and it should be understood that other components of the devices, methods, and systems of FIGS. 1-4 and 6-12 may implement those steps instead.

At 502, the system may present search results from one or more 3D asset libraries (e.g., stored at data structure 112 of FIGS. 1A-1C). The search results may be provided based on a current context of the 3D environment (e.g., 3D environment 106 of FIG. 1A) and/or based on one or more search terms input by a user. At 504, the system may insert or import a 3D asset (e.g., beach chair 114) into the 3D environment (e.g., 3D environment 106 of FIG. 1A) based on receiving user input, to cause the 3D environment to include a newly added 3D object 506 (e.g., beach chair 114).

At 508 and 510, the system may utilize a virtual camera to perform pixel (or voxel) analysis of the current 3D scene (e.g., prior to insertion of newly added 3D object 506 and/or after insertion of newly added 3D object 506) and/or may perform pixel (or voxel) analysis of one or more portions of the current 3D scene (e.g., the newly added 3D object 506). In some embodiments, the virtual camera may be placed in the 3D environment (e.g., a game engine environment) as the 3D environment is being built, and the virtual camera may act as a sensor for pixel (or voxel) data that feeds into a semantic engine (e.g., at 516).

At 512, the system may employ any suitable computer-implemented technique, e.g., machine learning, such as, for example, a convolutional neural network (CNN) to perform image analysis and/or to generate tags, keywords, and/or metadata for one or more 3D objects (e.g., at 514). In some embodiments, such tags, keywords and/or metadata 514 may be based at least in part on a user's historical interactions, e.g., user search keywords and/or tags 524, and/or user search history 526. In some embodiments, the system may employ AI-powered techniques to, based on identified 3D objects in the scene, their attributes, and the scene's understanding, generate tags, such as, for example, object names, contexts (e.g., "kitchen," "outdoor"), material descriptions (e.g., "wooden," "metallic"), and/or any other suitable tags. In some embodiments, to generate meaningful tags, the system can query a database or knowledge graph (e.g., stored at data structure 112) that associates objects, materials, themes, and/or any other suitable data related to 3D environments. For instance, if the system recognizes a sofa, the system may query the database to find tags like "furniture," "living room," and "fabric." In some embodiments, the system may use natural language generation techniques to convert the identified tags into human-readable descriptions or labels, and the system may extrapolate on the tags it created during its database query to create numerous and further detailed tags for searching an online or offline 3D asset (or 3D content) library 504.

In some embodiments, the CNN may be used to perform computer vision, including detecting, segmenting and feature extraction in relation to one or more portions of the 3D environment. In some embodiments, the system may utilize any suitable object recognition techniques to identify objects within the 3D scene, e.g., using one or more machine learning models trained on large datasets to recognize a wide range of objects based on their shape and appearance and/or any other suitable factors. In some embodiments, the system may, by analyzing the visual properties of surfaces in the scene (e.g., using AI-powered techniques), determine materials and textures of the 3D environment or one or more portions thereof, using, for example, mapping, color analysis, and/or material recognition using one or more databases of material properties.

In some embodiments, the system may perform 3D scene understanding using previously generated metadata and tags and/or spatial relationships between objects to understand the scene's layout and purpose. For example, if the system recognizes a table, chairs, and/or a dining setting in the 3D environment, the system may tag the 3D scene (or a portion thereof) as a "dining room."

At 516, the system may, having identified one or more 3D objects and their attributes (e.g., placement or location of a 3D object in the 3D scene, scale, and/or other identifying features such as, for example, color, styles, themes and/or any other suitable features), generate a semantic understanding of the 3D scene, e.g., in the form of a semantic graph and/or semantic map. The semantic map may be constructed and, in real time, updated as the understanding of the 3D space progresses, to provide recommended 3D objects for insertion. The system may create an understanding of the scene as a whole in combination with users' inputs, e.g., by deploying a virtual camera in a real-time 3D VR scene, which may provide initial input to a semantics engine that can produce context specifications, e.g., at 520. In some embodiments, the one or more candidate context specifications may be generated based at least in part on analyzed keywords (e.g., associated with step 514 and/or user provided context 522). In some embodiments, the system may obtain a list of objects identified in a scene and/or a general description of the scene, which may be used to extract the initial input to define a context of the 3D environment. In some embodiments, a user's search history when looking for objects and respective metadata may be utilized by the semantics engine, which may reduce the time until a detailed context specification can be established.

As shown at 520, the system may employ a semantics engine to produce one or more candidate context specifications, each of which may include all (or a subset of) the extracted semantics data from the 3D environment or portions thereof, based on the semantic understanding determined at 516 and the context 518 from analyzed keywords. As shown at 528, the context specification may be stored as a semantic graph that maintains the spatial and scale relationships between 3D assets or objects, as well as other properties (e.g., color, style, material, and/or any other suitable properties) that can be extracted by processing the input from the virtual cameras and/or by processing available metadata and tags associated with the 3D assets in the 3D scene. In some embodiments, a graph data structure is used to store the semantics understanding in a graph database to represent the semantics of the 3D scene, in order to store data in a format that is optimal or adapted for a computing device to traverse through and analyze. In some embodiments, the 3D objects or assets and their characteristics are maintained as vertices or nodes of the graph, while spatial relationships (e.g., scale, position, or any other suitable relationship) between 3D objects are maintained as edges between nodes of the graph. For example, the spatial relationship between the first and second 3D objects in the 3D environment may correspond to one or more edges between nodes of the knowledge graph representing the first and second 3D objects. In some embodiments, a semantic graph for language e.g., WordNet (which may be stored in a graph database) may be utilized to enrich the context specification in terms of semantic understanding of the scene. In some embodiments, nodes and/or edges between nodes may be assigned different weights indicative of the impact such nodes and/or edges should have on a context determination for the 3D environment. In some embodiments, at 520, user confirmation may be received on the most accurate context, e.g., the user may select a particular natural language description of the context from among one or more candidate context descriptions.

At 530, the system may, in generating one or more recommended 3D objects for insertion into the 3D environment, generate a natural language representation of the context determined at 528. For example, the system may employ a graph convolutional network (GCN) or a large language model (LLM), or any other suitable techniques, or any other combination thereof, at 530. The LLM may be configured to generate text in desired formats using text prompts, and/or visual elements (e.g., by visually inspecting pixels or voxels for use in a neural network), as input, and/or other modalities.

In some embodiments, as the LLM is generating outputs in the form of detailed search queries, the system may display some keywords from the text such as, for example, "17th century" or "Victorian" or "gold." For example, such keywords may be presented to the user as sliders (or other suitable selectable user interface elements) that allow the user to quickly drag one of the values up to emphasize it more, or reduce one of the themes, in order to allow the LLM more freedom in its description in that area. As a non-limiting example, if the LLM is given wider allowance or latitude on the "17th century" theme, the LLM may not include as many descriptive terms around that theme and instead allow more general descriptions on the visual style that may or may not allow the search results to include furniture from the 16th or 18th century as well.

At 531, the system may segment and group the natural language descriptions to create prompts, and at 532, the system may perform an API call, or otherwise transmit data, to interface with one or more 3D objects. For example, the system may call respective APIs and provide different portions of the natural language representation of the 3D scene as input. In some embodiments, the system may prompt the LLM to generate search strings or sets of keywords or tags with which to search through the 3D asset libraries and complete descriptions and detailed sentences. For example, an API for the 3D content library may be configured to receive and process longer descriptive sentences as search input.

In some embodiments, the system may, using the LLM, enable a semantic engine to produce a series of tags (or expanded descriptions) used by the search engine inside one or more selected 3D asset libraries, which may be accessed via API. The results from the search may be filtered through user options or automatic options as listed below. In some embodiments, the system may permit the user to, at any point, abort the process, close the tool, or take manual control of the searching of assets. If the user does not, the system may be allowed to continually analyze the 3D scene and keep making recommendations and present 3D candidates at a number and interval set by the user's settings (or otherwise at predetermined in; or objects 124, 114, 118 of FIG. 1B; or objects 128, 132, and 118 of FIG. 1C) determined to sufficiently match the determined context, e.g., based on comparing a natural language description and/or metadata of one or more portions of the current 3D environment with a natural language description and/or metadata of 3D objects in one or more 3D content libraries. In some embodiments, such one or more recommended 3D objects may be generated based on 3D asset metadata and/or image analysis, and may adapt its search to differing APIs and 3D libraries using LLM technology.

In some embodiments, the system may, in recommending 3D objects from a 3D content library, adapt or modify one or more 3D objects present in the library, e.g., based on the determined context for the 3D environment. For example, the system may determine that at least one recommended 3D object is a 3D object that partially matches the stored context. For example, if a particular 3D content library does not have a beach ball object (e.g., object 118 of FIG. 1C), but does include a basketball object, the system may determine that while a basketball is similar in appearance to a beach ball, the natural language description and/or metadata and/or other data associated with the basketball does not sufficiently match the determined context. For example, the system may determine that a relevancy threshold for the basketball is below a threshold. On the other hand, the system may, in this circumstance, modify the basketball object to be more relevant to the current 3D environment. For example, the system may input the basketball, and/or a prompt (e.g., "Modify a basketball to make it look more like a beach ball"), to a generative machine learning model, to generate a 3D object similar to object 118, which more closely matches the determined context of the 3D environment, and the system may provide such modified object as a recommended 3D object for insertion.

In some embodiments, the system may modify one or more capabilities of one or more 3D content libraries using various rules and/or prompts to the LLM to adapt the searchability of a 3D asset to a technology level of the library being targeted. As an example, for one 3D content library, a natural language search or large language search may be employed to search the library for relevant content. It may be that another 3D content library is not able to handle this capability, and in such an instance, the system may be configured to query the 3D content library with only search hashtags or individual search terms into the API of the library's search engine to allow the system to function, even if tags of many words with a detailed description of the 3D object are not able to be queried.

At 534, the system may receive a user interaction, e.g., selection of one or more of the recommended 3D object(s) for insertion, which may be presented at 502, and the system may insert such selected 3D object(s) into the 3D environment. In some embodiments, the system may update the context for the 3D environment based at least in part on such addition to the 3D environment.

In some embodiments, at 502, the system may receive user input requesting to insert a particular 3D object into the 3D environment. For example, in the example of FIG. 1A, where the context of the 3D environment relates to a tropical beach scene, the user may request to insert a 3D object that is determined by the system as not sufficiently related to a beach scene, e.g., a polar bear. The system may determine that metadata and/or tags associated with the polar bear, e.g., "snow" and/or "ice" may not be sufficiently similar to metadata and/or tags associated with a beach, and/or that such metadata or natural language descriptions of the polar bear lack a common term, or lack at least a threshold number of terms, with the context or natural language description of the beach scene. Based on such determination, the system may determine that one or more attributes of the particular object (e.g., a polar bear) do not match the stored context of 3D environment 106. In this instance, the system may provide for display, at the user interface (e.g., user interface 100 of FIGS. 1A-1C) of the computing device (e.g., computing device 104 of FIG. 1A), an indication that the particular 3D object does not match the stored context of the 3D environment, and/or a prompt for further input to confirm whether the particular 3D object should be inserted into the 3D environment. In some embodiments, the system may instead suggest recommended objects 114, 116, and/or 118, and/or the system may instead suggest other objects that share an attribute (e.g., animal type) with the particular object (e.g., the polar bear) and that would be more suitable for a tropical beach environment, e.g., animals such as, for example, dolphins, sharks or birds, instead of the polar bear.

Figure 6:
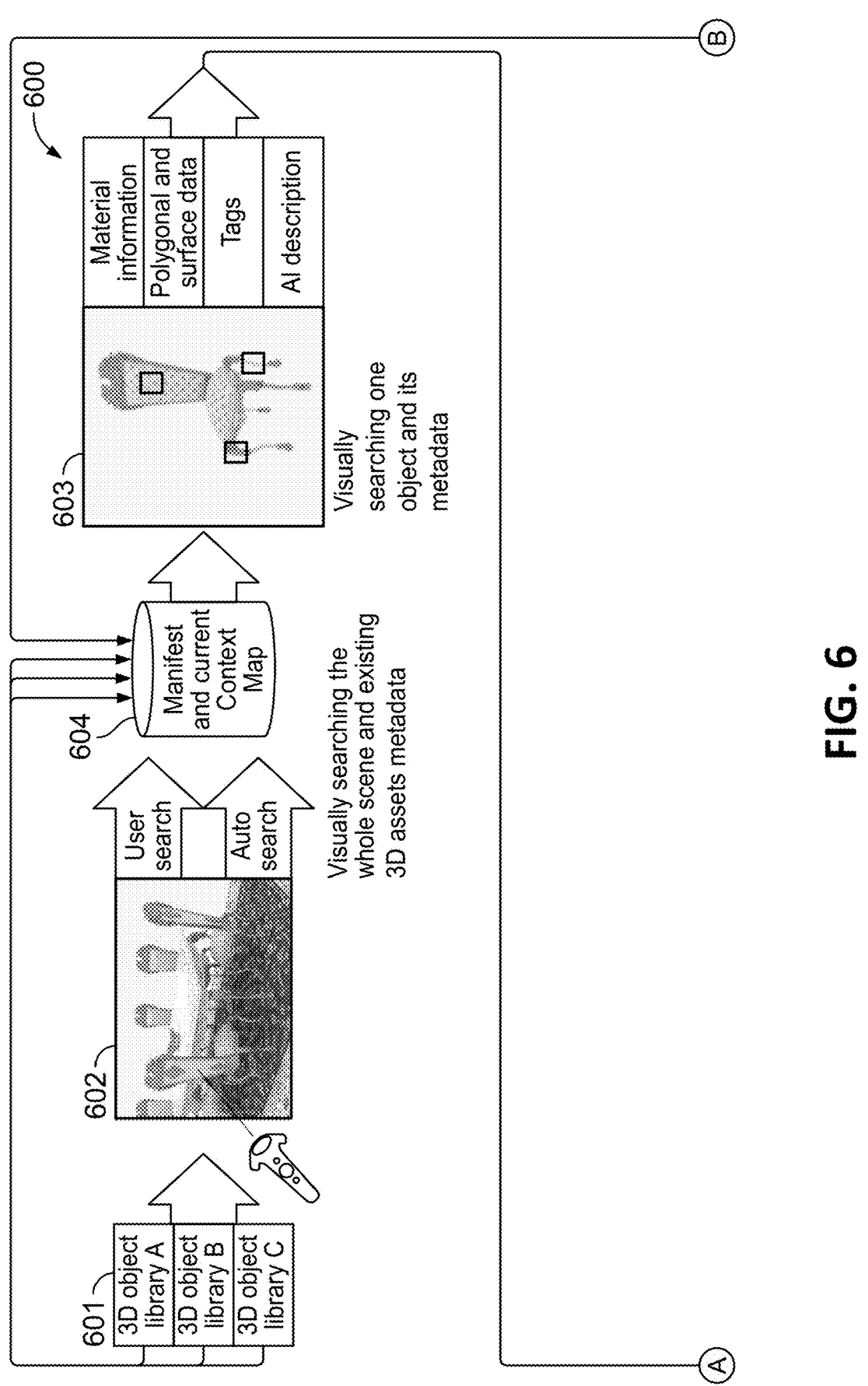
FIG. 6 is a flowchart of an illustrative process for providing recommended 3D objects for a 3D environment, in accordance with some embodiments of this disclosure.
Figure 6:
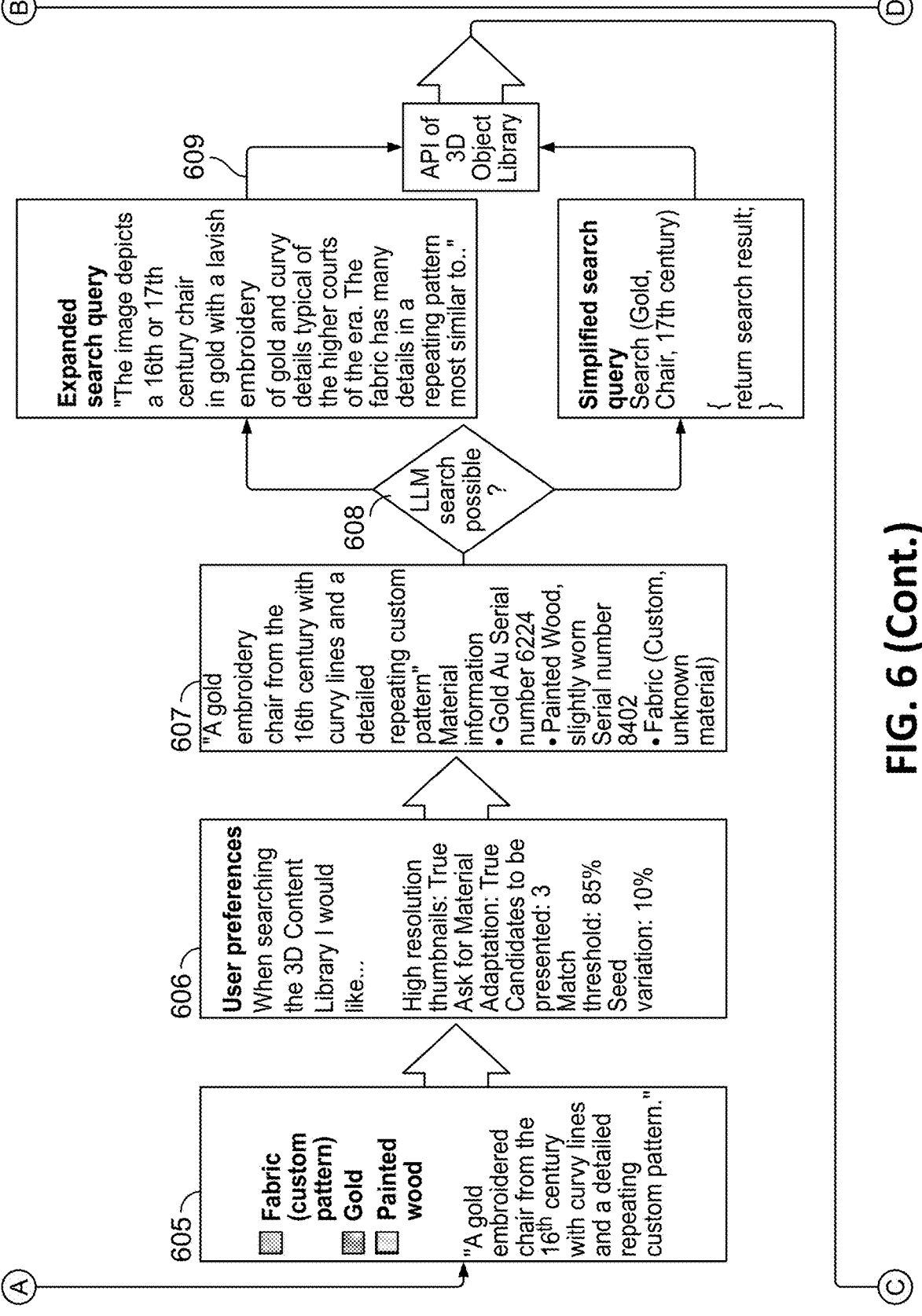
Figure 6:
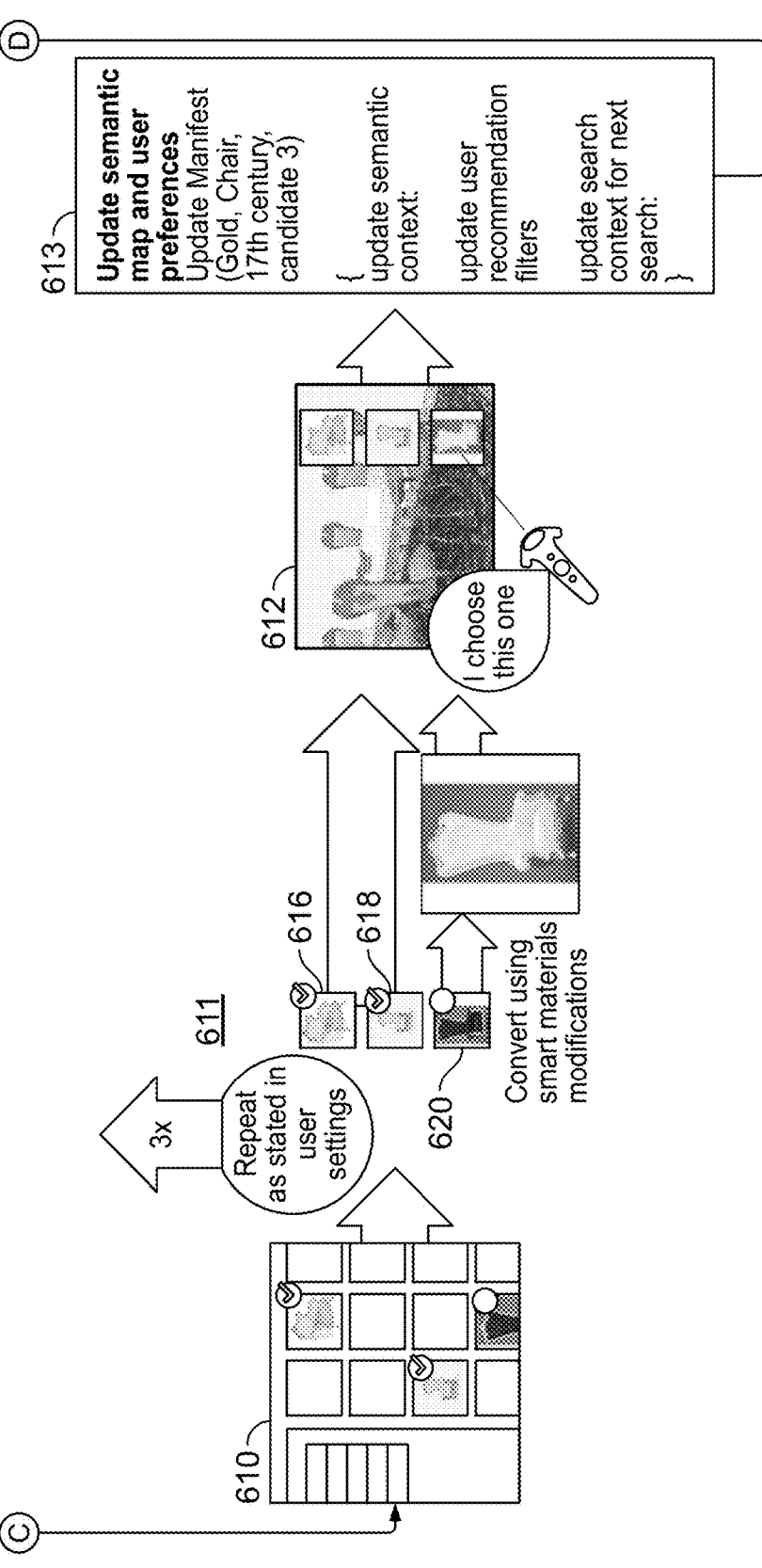

FIG. 6 is a flowchart of an illustrative process 600 for providing recommended 3D objects for a 3D environment, in accordance with some embodiments of this disclosure. In various embodiments, the individual steps of process 1000 may be implemented by one or more components of the devices, methods, and systems of FIGS. 1-5 and 7-12 and may be performed in combination with any of the other processes and aspects described herein. Although the present disclosure may describe certain steps of process 600 (and of other processes described herein) as being implemented by certain components of the devices, methods, and systems of FIGS. 1-5 and 7-12, this is for purposes of illustration only, and it should be understood that other components of the devices, methods, and systems of FIGS. 1-5 and 7-12 may implement those steps instead. While FIG. 6 may at least in part be a linear process, any suitable number of steps of the process may be continuously refined using an iterative approach (e.g., at step 610, the results may be iterated upon to find the best candidates for recommendation). FIG. 6 describes searching and requesting new 3D assets based on metadata, image analysis, material library settings and APIs.

At 601, the system may run a start-up script that checks to ensure compatibility with the current version of the system and the intended connection components, engine, library, and/or library API and/or other components, using any suitable technique. For example, interfacing software may share its information on versioning to allow third-party actors or separate teams to adjust their components to match each other.

In some embodiments, at 601, the system may verify whether an engine version matches the current engine to allow the system to adapt to visual style and engine capabilities and employ, for example, live particle systems and post processing effects for the purposes of counterbalancing, so as to not disturb the search results. In some embodiments, at 601, the system may identify a library type (e.g., of 3D content library A, 3D content library B, and/or 3D content library C). For example, the 3D content libraries A, B, or C may correspond to any suitable 3D content library, e.g., TurboSquid® or Quixel Megascans®, and the system may use the identified library type to determine whether the user, and by extension the system, is interacting with, e.g., TurboSquid or Quixel Megascans, or both. Such determination may impact user settings, system settings and preferences that are saved to allow the user to use different semantic engines or settings depending on the quality and styles of assets usually found in these (potentially distinct) types of libraries. In some embodiments, the system may determine a library API version to enable the system to adjust its prompts based on its API capabilities. For example, if Quixel Megascans has updated their API to receive long text descriptive searches, such as those generated by an LLM, this check can ensure that the system enables that feature.

At 602, the system may generate a 3D environment (e.g., including a VR scene) in which the world is being built based at least in part on user inputs. For example, the system may determine that the 3D environment shown at 602 has a natural language description and/or context that relates to a 17th-century interior. As shown at 602, the system may receive a user search for one or more 3D objects, or may automatically present a 3D object as a candidate for insertion (or automatically insert a 3D object) that is relevant to the context of the current 3D scene. In some embodiments, the system may receive input from the user pointing or otherwise gesturing towards or selecting (e.g., tapping on or clicking on) a particular 3D object, to request performance of a search query based on the selected 3D object and/or to request a recommendation based on the overall 3D scene and/or metadata thereof. In some embodiments, the system may receive input (e.g., determine that the user's gaze is directed at, that a user is pointing towards, and/or voice input) selecting a particular 3D object, to request to be presented with variants of the 3D object. In some embodiments, if the system determines that a selection has not been received from a user for a threshold period of time, or that a search or combine request, or recommendation request, has not been received from the user for a threshold period of time, the system may continuously analyze the 3D scene to continuously recommend 3D assets based on the updated visual input from the deployed scene camera or the user perspective camera, e.g., as a default setting.

At 604, the system may update a manifest and current context map or database 604 based on information associated with previously selected and/or previously inserted objects in the 3D environment, during the current session or in a previous session, and/or based on information associated with LLM analysis of objects and/or a current context of the 3D world environment. As inputs are received from the user and 3D objects are added to the 3D environment, the system may solidify and update the context based on user choices and feedback. In some embodiments, if there is already data in this database, the 3D object output from the image analysis may be checked here before being processed in further steps. In some embodiments, if the 3D object being pointed at or otherwise selected in the scene by the user already has a semantic description, the system may check how well the gathered data matches the already-saved data about the 3D asset. For example, LLM descriptions may change, depending on changed user settings or an angle from which the 3D asset was visually analyzed at a previous time. In some embodiments, the data may be merged based on threshold settings or discarded if the initial analysis is similar, and the system may pull the data directly from the database for use in further processing.

In some embodiments, the collected semantic understanding of one or more 3D objects in the 3D environment may be created based on output from the previous step(s), which can be processed as text. For example, the system may combine the results of performing visual inspection of the 3D object (either as a whole scene or as individual 3D assets) and the metadata analysis from the one or more 3D content libraries to output text-based information into, e.g., a predetermined format that is suitable for use together with LLMs, and such text-based information may include any suitable detail, e.g., material and/or texture data of the one or more 3D objects in the 3D environment.

In some embodiments, analysis of texture data by the system, for example, may yield a detailed explanation of the pattern on one of, or parts of, the materials. Such same texture may also be saved as a sample to be compared with other materials, such as, for example, a fabric sample collected by one or more image detection algorithms. For example, the system may store a description of the furniture piece itself as an image and/or text description, and each of such data points tagged and saved individually may be included in a detailed and structured data structure.

In some embodiments, the description of a 3D object may be expanded upon by the LLM, such as where standard or dynamic prompts may trigger longer, shorter, more detailed, artistic and/or more structured descriptions depending on the library API version that is meant to receive it. This description may also (e.g., depending on preferences) allow longer and expanded descriptions that detail many different parts of the 3D object. This may be done using simple prompt engineering over how the LLM should and should not break down its description of an object. These prompts may then be assigned based on user settings and/or the 3D object in question, e.g., where a chair may hold a different description architecture than a wall segment, for example. In some embodiments, such data may be collected into a text format that describes the system's understanding about a particular object, and the data may include samples the text refers to. As an example, the three texture and material samples seen in 605 may be saved as individual reference images (as well as text descriptions), which may be limited in resolution but nonetheless contain enough data to enable the semantic engine can re-read the data and compare the data with the results of subsequent search queries. In some embodiments, the system may register the data as neural weights in versions of AI models that have image recognition and analysis capabilities, and that after having digested the image, may not need the references to build its own model of what the textures and combinations of materials should look like to be aligned with the context.

In some embodiments, the system may keep separate, in a temporary file, any new data added to the database from the global context map, pending the evaluation of the new data by the user, e.g., at 612 or 613. In some embodiments, the context map 604 may be checked against the current prompt or description (e.g., associated with a 3D object newly added to the 3D environment), to allow or merge descriptions of objects, e.g., depending on the user's actions at 612 or 613. For example, the semantic map at 604 may be continuously updated as the user selects 3D objects for insertion, e.g., the system may update global settings or settings for a specific type of furniture by proximity and association, based on the selected 3D object.

At 605, the system may utilize a 3D asset-based scene camera to capture an image of, and analyze, a 3D asset in isolation by entering the scene object container of the 3D asset, to inspect and/or modify individual 3D assets in isolation. In some embodiments, selecting (e.g., via double clicking) the 3D asset in its content folder allows the user to see the 3D asset from this camera, in a similar manner as entering a new 3D scene containing only the 3D asset, prefab or object in question. As shown in FIG. 6, the system may identify attributes in the 3D scene of "Fabric (custom pattern)," "Gold," and "Painted wood," and may use such attributes to generate a description of the 3D asset or 3D object, such as "A gold embroidered chair from the 16th century with curvy lines and a detailed repeating custom pattern" based at least in part on analysis performed using the image captured by the virtual camera.

In some embodiments, the system may use the virtual camera to capture one or more portions of the 3D environment and segment specific visual elements of one or more 3D assets or objects based on such captured portions, which may avoid noise, e.g., distracting background content or other assets, obscuring the analysis of the 3D asset of interest. For example, to view a particular 3D asset or object in isolation, the system may use a 3D object-specific 3D virtual camera to obtain visual information of the 3D asset, e.g., the virtual camera and the 3D asset can be updated, rotated, and otherwise modified in real time. As another example, the system may obtain an unobstructed view of the 3D asset by masking such 3D asset out of the 3D scene using any suitable computer-implemented technique, e.g., an image recognition technique such as, for example, applying a matte mask over the 3D scene.

In some embodiments, the system may obtain 3D pixel (or voxel) data of any particular 3D asset or 3D object through a rendering pipeline, which may be executed by the system for each frame, or each captured image of the 3D scene at a certain time. For example, each 3D asset or 3D object may be drawn in passes and may be filtered using a z pass (e.g., a depth-based pass) to identify 3D assets at different depths of images captured by the virtual camera, for placing pixels (or voxels) on the screen in the correct order to avoid overdraw. This may use pixels (or voxels) drawn for a specific object to allow for unobstructed pixel analysis of the 3D object even in a crowded scene with a lot of noise. This may advantageously allow for a more clear and readable analysis of texture data and/or other portions of a 3D object using an image analysis algorithm, which may otherwise be distracted by complicated lighting tricks meant to make the 3D asset look more realistic when shown to a user, and avoid having portions of the rendering pipeline where 3D objects may be unlit and without post processing effects (which may be added once the entire image has been drawn to a buffer).

In some embodiments, at 603, the system may obtain and process tags and/or metadata associated with one or more 3D objects (e.g., a recommended 3D object presented and/or selected for insertion), where such tags and/or metadata may include materials information, polygonal and/or surface data, and/or texture information. In some embodiments, the texture, material and metadata may be AI-generated in a dynamic manner, or retrieved from one or more 3D content libraries. For example, 3D content library A in FIG. 6 (e.g., a Quixel Megascans library) may allow API access for the system to retrieve data such as, for example, search words and tags already related to the 3D object, upon them being added to the library; metadata on polygon count size; smart material information; texture and texture mask information; and/or any other suitable data; or any combination thereof.

At 606, the system may store and access user preferences of one or more users providing inputs to construct the 3D environment. For example, the user preferences may be a list stored on a per user basis, and/or may describe what thresholds values, variations and number of candidate objects (e.g., three) for insertion should be presented at any given time to a particular user. The user preferences may also indicate, e.g., by default or based on user input, that the system should attempt to rebuild any asset that has a match threshold of a certain amount, as described in more detail at 611. Such threshold values may guide the amount of variation allowed to the system upon presenting 3D asset candidates to the user, which may impact the span of which the system provides the user the opportunity to select 3D assets that are, e.g., far or close to each other, and/or close or far from the global semantic context of the 3D world or area being built. The user preferences may include any other suitable data stored at a data structure, e.g., user interface interaction settings, and/or voice interaction settings. As shown at 606, as a non-limiting example, the system may identify user preferences as indicting preferences for high resolution thumbnails; preferences to ask for material adaptation; preferences to present at least three candidate 3D objects; preferences that such candidates exceed a match threshold of 85% with respect to a current context; and a preference for a seed variation of 10%. Such preferences may be received implicitly (e.g., by monitoring user interactions and habits) and/or explicitly (e.g., receiving user input specifying particular preferences, such as, for example, "When searching the 3D content library, I would like . . . " followed by particular preferences.

At 607, the system may generate a 3D asset-specific semantic description file for a particular 3D object. In some embodiments, such file may be retrieved from a previously compiled semantic description of the 3D object, e.g., from context map database 604, such as if data associated with the particular 3D object was previously identified and stored. In a non-limiting example, as shown at 607, the file may comprise a general description of "A gold embroidered chair from the 16th century with curvy lines and a detailed repeating custom pattern," and the file may comprise saved data extracted from the 3D object and/or retrieved metadata from previous processing, which may be packaged based at least in part on user preferences. In an example, the data may include material information, e.g., gold Au serial number 6224; painted wood, slightly worn serial number 8402; and fabric (custom, unknown material). For example, if a user desires to migrate or keep a context map generated when working with a first 3D content library, the system may enable the user to apply the context map to a different, second 3D content library. By having a standardized way of saving the data and a description of the particular asset currently placed in the 3D environment (e.g., the game engine), that data may be re-used, operated upon and adapted depending on the library or API being used at a later time. In some embodiments, the data can be stored in a compact format, e.g., as text data that holds references to the specific library in question. For example, the data may describe the specific hexadecimals used in the textures or a serial number that evokes a pointer into the library storing the 3D asset, and also all of its applied smart materials and masks, which may minimize the amount of data stored by the system while enabling the system to nonetheless retrieve large, detailed data sets via the same engine from which the data was stored.

At 608, expanded and/or simplified searches can be applied based on the capabilities of the 3D content library and/or its API capabilities, e.g., the API version and its reported capabilities inform the decision between expanded or simplified search. In some embodiments, at 608, the system may use an LLM to break down a 3D asset using input from the image analysis, and the 3D assets metadata, to then encode this data into, for example, numerical data indicative of a detailed description of the specifics of the 3D asset and its properties. In some embodiments, user-generated 3D objects may be contributed to a 3D library, and the system may be used to automatically categorize and index such 3D objects and/or other 3D objects. The system may organize 3D libraries, including allowing 3D files to be ordered and searchable while also saving relational information and operating under the limitations of legacy search engines and, on top of that, allowing the LLMs detailed description of the 3D asset, without image analysis or long descriptions of text, to be saved. This may also in extension allow LLMs to "reach" into the world of 3D in a way that previously may not have been possible and quickly retrieve and refer to vast datasets in 3D libraries.

For example, at 608, the system may determine whether an LLM search is possible; if so, the system may generate an expanded search query (e.g., "The image depicts a $16^{th}$ or $17^{th}$ century chair in gold with a lavish embroidery of gold and curvy details of the higher courts of the era. The fabric has many details in a repeating pattern most similar to . . . ") relative to the natural language description in 607, such as when the API is capable of accepting an LLM input having a defined set of characters (e.g., set in startup script described at 601 and processed to obtain a semantic understanding). In a non-limiting example, the system may generate a search query such as "A chair from the 16th or 17th century in gold with a lavish embroidery of gold and curvy details typical of the higher courts of the era. The fabric has many details in a repeating pattern most similar to . . . " Such details may allow the search engine of the 3D content library to find the optimum candidates based on indexed 3D models.

In some embodiments, to receive such a search query, the 3D content library may have its own LLM interface tightly interwoven with the rest of the architecture of the library's surrounding systems. For example, on the 3D content library side, a similar image analysis and/or metadata search may be used as described herein in relation to the overall system. By indexing 3D assets, the metadata (e.g., compressed descriptions or encoding of an asset) may be used to search metadata more directly, which may be arrived at by the two LLMs from indexing assets using the same or similar prompts and weights.

In some embodiments, based on the capabilities of the 3D content library and/or its API capabilities, the system may perform a simplified search query by breaking down the more complex description into more simple and standardized search queries, e.g., "gold," "chair," "$17^{th}$ century," which may be accurate descriptions depending on the size and complexity of the library. Such search queries can be selected by the system to trigger the most hits for a 3D asset type or the least hits for a 3D asset type to in an effort to narrow the scope to something more specific. This may be determined by user settings and may also become more and more accurate over many searches, and this becomes a fallback that can be used no matter if the 3D asset library has LLM integration or not.

At 609, an API of the 3D content library may take the search input from the system, e.g., as strings, and return the search results (e.g., a 3D object or 3D asset from the library) to the system using the LLM input or simplified input. The API may return a reference that points to a 3D asset or the 3D asset itself, using any suitable architecture. Using the API, the system can access previously generated metadata associated with the 3D objects in the 3D content library, and a 3D content library can enable a system of tags and queries to find the most relevant 3D objects for a user through a well-structured and comprehensive database using API integration and their tagging systems.

At 610, the system may return the search results as described above, and may re-perform or re-iterate the search until at least a certain number of 3D assets (e.g., three, specified in the user preferences or a default number for the system) are returned that meet the search criteria. For example, as the library search engine starts to return results, the system may perform image analysis including a similarity analysis in both the thumbnails and the returned asset itself. In some embodiments, 3D assets tags may be read by the system as a sole input for search. Alternatively, the 3D visual analysis can generate more tags based on the visual input of the scene and can combine that with the tags already previously stored as metadata to generate more accurate predictions for 3D asset candidates relevant to the current context. In some embodiments, the system may store additional tags that are related to a certain style of furniture, e.g., an indication as to how the user used similar assets in a previous session. For example, the theme can be used to help the system understand that when the user searches for "sci-fi throne," a 17th century velvet chair might also be a good candidate because the user is creating a sci-fi universe that has many of the thematic elements inspired by 17th century decor.

At 611, the system may present the candidate 3D assets (e.g., 616, 618, and 620). For example, the system may determine that a subset of such presented candidate 3D assets (e.g., 616 and 618) sufficiently match (e.g., exceed a threshold similarity score or share a threshold number of common features with) the semantic context of the current 3D environment, and thus may be presented as highly ranked candidates for insertion. In some embodiments, the system may, either by default or based on user preferences, decline to present identical or nearly identical recommended 3D objects, or only a certain number of similar objects (e.g., two). In some embodiments, the system may receive input from the user requesting that the recommended 3D objects presented to the user deviate by at least 10% to be presented with a slightly broader set of choices.

The system may determine that 3D object 620, while not a sufficiently similar match to the context of the 3D environment, deviates from the context of the 3D environment in terms of material, rather than form. That is, 3D object 620 may be selected as a possible candidate because image analysis indicated that certain attributes of 3D object 620, e.g., its silhouette, style and polygonal count, were sufficiently similar to the context of the 3D environment. The system may determine that, while not having a color or texture related to the current context of the 3D environment, 3D object 620 may be associated with a smart or modifiable material allowing such 3D object 620 to be modified to match the current context more closely while also adding variation to the set of candidates 616, 618, and 620. Thus, when a 3D object does not match the visual theme but has elements that match other search requirements based on the output of the LLM, such 3D asset may automatically (or based on a user request) be modified (e.g., not completely but using surface texture modifications) to better match the style or visual that the user was going for with the current context, and that the LLM likely intended to describe in its search terms. In some embodiments, the modifications of 3D object 620 may be performed using a generative machine learning model.

At 612, the system may receive selection of one or more of the recommended 3D objects for insertion into the 3D environment. For example, a selected 3D asset may be temporarily placed inside the scene in VR allowing for the user to direct a VR controller towards the 3D asset and drag and drop it into place. In some embodiments, one or more of the candidate 3D objects may be stored in a temporary file folder in the engine architecture, which may be flushed each time the user chooses a 3D asset (e.g., discarding the other candidates) or upon user request. In some embodiments, the system may import or insert 3D objects temporarily by way of a 3D content library streaming 3D into the 3D environment using a cloud solution and a dynamic 3D object in the scene that links to their library online. Such streaming capabilities can allow users to see how the 3D asset appears in the 3D scene prior to its more permanent insertion. In some embodiments, the system may employ a visual overlay, e.g., by streaming the pixels (or voxels) of the 3D asset-specific camera, on top of the 3D scene, the user may interact with an empty object of a 2D visualization while experiencing it as a 3D scene object. Once the 3D asset is committed into the scene by the user, the 3D asset may be loaded into the content folder of the engine and may be placed in the designated position.

At 613, the system may update the semantic map (at 604) based on the user selection(s) at 612, which may allow the system to adjust weights and/or biases (e.g., of specific nodes and/or edges between specific nodes) to accommodate a potential change in the context of the 3D environment based on the addition of the selected 3D object, e.g., the user may desire to take the look and feel of the 3D scene in a different direction. In some embodiments, the data sent to the semantic map may be in a format of a semantic graph, which provides a spatial relationship between the 3D objects in the 3D environment and the difference in context compared to other objects in the 3D environment. For example, such update may comprise an update for "gold, chair, $17^{th}$ century, candidate 3" to "update semantic context," "update user recommendation filters" and/or "update search context for next search."

In some embodiments, the system may utilize a generative machine learning model to automatically generate a second portion of the 3D environment based on the stored context and initial input. For example, the system may determine that a first portion of the 3D environment comprises a first 3D room (e.g., a dining room) of a structure (e.g., a 3D house) comprising a first plurality of 3D objects (e.g., $17^{th}$-century style furniture), based on inputs received from the user. The system may be configured to use the stored context, which may be related to $17^{th}$-century designs, to automatically generate a second portion of the 3D environment, e.g., a living room or fireplace room, comprising a second plurality of 3D objects related to 17th century styles (e.g., couches, chairs, and/or tapestries associated with $17^{th}$-century designs), and the user may be permitted to further modify such automatically generated portion. In some embodiments, the system may propose to replace (or automatically replace) certain objects (or rooms or other portions) in the 3D environment with other similar objects (or rooms or other portions) more similar to the stored context.

In some embodiments, the system may be deployed as a component in an automatic 3D scene or art generation pipeline where the system takes as input the current 3D scene and provides its output to a generative AI algorithm. Such output may form the basis for identifying actual 3D assets that are relevant and fall within the current context. Alternatively, the output may provide the characteristics that the generative AI processes to create the 3D scene or art. In some embodiments, the system can automatically (or in response to a user request) combine 3D assets already placed in the scene (or not yet placed in the 3D scene). For example, the system may merge a 3D model of a sofa with the 3D model of a chair to instruct the system to search for (or otherwise generate) a chair with the same style as the sofa.

In some embodiments, multiple users may contribute to the 3D environment synchronously or asynchronously. For example, the system may determine the context of such 3D environment based on a first context associated with first portion of the 3D environment generated based on inputs received from the first user, a second context associated with a second portion of the 3D environment generated based on inputs received from the second user, and a common context associated with the inputs received from the first user and the inputs received from the second user. As a non-limiting example, the system may segment the context by determining that a first user is building a portion of a 3D world related to a context of a beach scene, and that the second user is building a portion of the 3D world related to a context of an outer space theme. The system may identify objects having commonalties (e.g., similar natural language descriptions and/or metadata tags) to both scenes, e.g., a rocket ship landing in the ocean from outer space, and perform merging of such common context near the boundaries of the two 3D world portions, e.g., the beach scene and the outer space scene. In some embodiments, there may be an overall 3D world context that applies to each of the sub-contexts (e.g., the world context may be "1700s" and a first sub-context may relate to a newly constructed building in the 1700s, while a second sub-context may relate to a dilapidated building in the 1700s).

In some embodiments, where multiple users in the same VR space are designing for different contexts, each user may have their own context specification maintained for them. Depending on similarities between each of the context specifications, a metacontext (or 3D world context) may be established to group together two or more context specifications, to allow abstraction to a common context while maintaining a more specific context within each user's design space. A user may choose to disconnect from the universal style. This connection between individual and universal context may be visualized and quickly turned on or off, or activated based on one or more user profiles, depending on position in 3D space.

In some embodiments, if the system determines that multiple users are contributing to building the same 3D world, the system may enforce, steer, and/or align the theme towards a common goal. The system may receive input from the multiple users working on the same project (e.g., on project metadata connectivity or versioning metadata of certain software). In some embodiments, the system may, to allow the world builders to choose when to stick to the exact same theme and when to expand on the theme, present a synchronicity score above each 3D asset being presented as a candidate. For example, 3D assets already placed in the scene can have a highest synchronicity score since such 3D assets are contributing to the theme description based on their visual input to the system as well as the metadata they carry. The system may utilize a filter to prevent already proposed (or already inserted) 3D assets from being presented as candidates again, unless the user moves to a different area and is looking to build a similar room or space in another building or at another portion of the 3D environment, e.g., in which case the input from the virtual camera may be largely reset by moving to the new position or FOV. For example, a current context may be updated based on a user shifting a FOV of an HMD while building the 3D environment. The system may help establish synchronicity among the 3D assets and the context of the 3D scene by using virtual cameras in the scene and/or metadata and 3D asset-specific camera(s) to analyze the characteristics or properties of the 3D assets.

In some embodiments, the system may use the synchronicity score to introduce some variation while still generally sticking to a theme associated with a current context. For example, 3D assets that have a 100% synchronicity score (or otherwise have a synchronicity score above a particular threshold) may be eliminated as new candidates since they may add little to no variation into the scene. On the other hand, 3D assets having a 90% synchronicity score (or otherwise have a synchronicity score below a particular threshold) may be scored as more valuable since they are closely in line with the context without being duplicative. If the users decide to stay a bit looser and more creative, then assets with a lower synchronicity score may be suggested, e.g., based on user preferences, for example, this may be set as a float value that narrows or widens the selection radius.

In some embodiments, the system may determine how automatic or selectable a context should be for any given user at any given time or location as he or she is working in the 3D space, e.g., who, where and what a user(s) is working on can determine the recommendations the user(s) receive from the system. In some embodiments, the system enables users to disconnect from the universal or overall world context being provided for any given level or world in which two (or more) world builders are providing inputs, which may be useful when styles diverge intentionally as part of the world building narrative or as areas stand in contrast with each other due to other characteristics, styles and story elements presented by the interactive world being constructed. In some embodiments, the universal context being created in the setup (and subsequent learning) of the system as it forms a context together with the artists from the beginning of the project may be saved and referred to. For example, the system may permit a user to select an empty context file and start training the system for his or her own region of the 3D environment, and the user may be permitted to create a copy of the current context (a fork) and start adding (intentionally selecting) other assets that are at the edge or outside of the system parameters for the copied context, skewing the system toward a new context while still preserving some elements from the universal context, without impacting the universal theme.

In some embodiments, the themes may be loaded and saved as files and/or triggered by navigation in 3D. For example, a user or artist working in one region of the 3D environment or 3D map may start a new file or fork related to a context, and attach that context to the region in which he or she works. Such context region may be managed by the system as a heat map where one context in one region meets the bounds of another region based on users placing thematic objects in each region. In some embodiments, the system may use a default ruleset or a user specified ruleset (e.g., selected by each user depending on system settings and privileges) to determine how two or more themes that meet in the middle of the 3D world are managed, merged or overwritten. For example, based on the rules or otherwise based on a determination by the system, one context region may hold hierarchy over another, meaning that the rules of one context may take control over the recommendation engine once a world builder moves into that region, whether or not they have been developed and worked with their own context set so far. The system may be guided by a set of colliders or heatmaps that blend or overwrite each other based on the rule set, and that filters through a system of user set rules to allow or disallow certain candidate 3D assets to be presented to the specific user.

In some embodiments, the system may track a plurality of inputs (e.g., selecting different 3D objects, placing and/or manipulating 3D objects, creating barriers and/or boundaries between different portions of the 3D environment) received via the user interface in relation to the 3D environment over time, and store indications of the plurality of received inputs at the data structure (e.g., natural language description of 3D objects selected for insertion into the 3D environment). The system may determine the context of the 3D environment based at least in part on analyzing the stored indications of the plurality of received inputs reflective of the user's behaviors. The system may provide for display a plurality of recommended 3D objects relevant to a stored current context of the 3D environment, including providing a first recommended 3D object at a first time, and, based on the stored indications of the plurality of received inputs, preventing display of the first recommended 3D object at a second time later than the first time, and instead providing a second recommended 3D object that is more similar to the current context. For example, as the building of the 3D environment coalesces around a particular context, certain types of 3D objects (e.g., associated with a context that recent inputs are diverging from) may be filtered out as recommendations.

Figure 7:
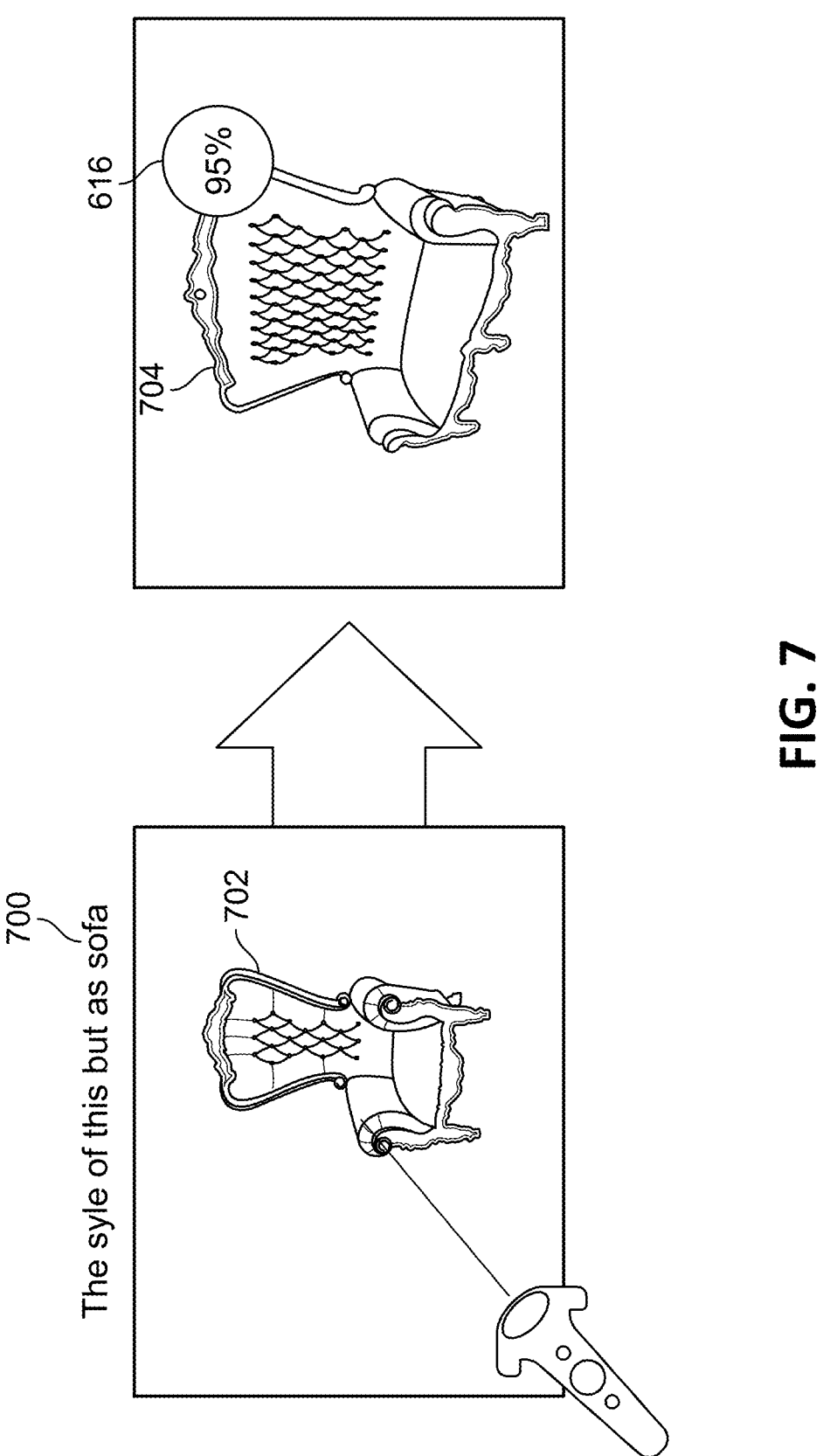
FIG. 7 is an example of determining a synchronicity score, in accordance with some embodiments of this disclosure.

FIG. 7 is an example of determining a synchronicity score, in accordance with some embodiments of this disclosure. The system may allow a user to select and point to objects via a voice command, text input or any other suitable user interface commands in VR, e.g., "Please search for object X in the style of object Y," where object Y can be indicated either in the 3D content library or in the VR world itself. As shown in FIG. 7, the system may receive input 700 of "The style of this but as sofa" where "this" refers to an input 3D object, and may identify 3D object 704 as having a synchronicity score of 95% with respect to 3D object 702, which may exceed a threshold score. 3D object 704 may be identified as a candidate for insertion based on such synchronicity score. In some embodiments, the synchronicity score may also represent the synchronicity between a global semantic map for the overall 3D environment, and a local semantic map for a portion of the overall 3D environment, to keep artists on track while they design the 3D world around them (e.g., while immersed in VR via an HMD). In some embodiments, the system may perform multiuser recommendations. For example, the system may allow a 3D environment to be generated based on simultaneous inputs from other users if such users are working in the same VR space. The context specification may be universal and shared across all users, and the synchronicity value may be shown to the user visually, to provide exact feedback to the user with respect to how synchronized each placed 3D asset is with the current context.

Figure 8:
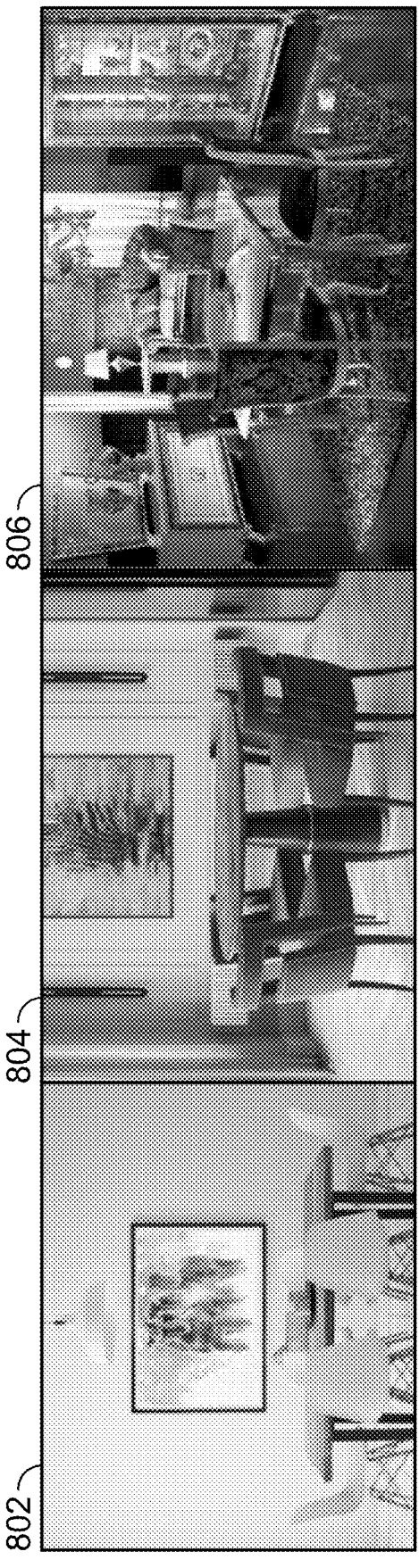
FIG. 8 shows illustrative 3D environments, in accordance with some embodiments of this disclosure.

FIG. 8 shows illustrative 3D environments 800, 802, and 804, in accordance with some embodiments of this disclosure. The system may generate 3D environments 800, 802, and 804 based on inputs from a user. Each of 3D environments 800, 802, and 804 may be generally related to different coffee room styles, but the system may determine different context specifications for each of 3D environments 800, 802, and 804. For example, the system may use a semantic engine to perform visual analysis of such 3D environments and generate a context specification, e.g., a context related to "light and bright minimalist coffee room" for 3D environment 802; a context related to "a contemporary coffee room" for 3D environment 804; and "a Victorian style coffee room" for 3D environment 806. The system may filter objects from a 3D content library based on such context specifications (e.g., detailed, feature-rich semantics) to show relevant (e.g., similarly styled or themed) 3D assets. In some embodiments, the system may generate detailed, feature-rich semantics, e.g., "a Victorian coffee room with tables having carved, golden details and chairs with maroon, velvet upholstery," and a natural language representation may be generated from the context specification that provides keywords for filtering and may be shared with the user. In some embodiments, the user may confirm if the understood context is aligned with their intent or refine the context specification by providing feedback to the system which may be provided by UI interaction, speech, and/or selection of one or more natural language representation candidates of the context as understood by the system or by selecting one of, e.g., three, 3D assets presented to the user. In some embodiments, the system loops over this feedback and adjusts its recommendations based on 3D objects selected by the user (and/or based on objects not selected), and/or updates the current context specification based on dynamic input from the semantic analysis of the 3D scene accruing in runtime.

In some embodiments, the system detects when the user has inserted a 3D object that does not fall within the current context. The user may then be prompted to confirm if he or she desires to maintain the 3D object in the 3D environment or find an alternative. If the system determines that the user desires to maintain the 3D object in the 3D environment, the system then may prompt the user for a response regarding whether the unmatching object should be included or excluded in future context specifications. In some embodiments, a visual indication may be added in the designer's view that shows if a 3D object is excluded from the context specification.

In some embodiments, the system may utilize an existing VR scene may be provided as input to the semantics engine to generate a context specification and a natural language representation that describes the scene. A verbosity level parameter (more or fewer words to describe the same context or theme) as input may define the level of detail to which the natural language representation is generated, which can be used for story telling or explaining the scene depending on the use.

In some embodiments, the system may utilize existing or generated concept art as input to the semantics engine to generate search results and 3D asset candidates relevant to a particular 3D object. For example, this may be useful when drawing the concept art to show objects that might inspire the 2D artist or to be picked by a 3D artist for later use in the 3D world-building, and/or for priming the system before any search result or 3D content is available or added by the user in 3D.

In some embodiments, while the system has been described in relation to providing tools for 3D world-building in VR and/or other 3D environments, the system may additionally or alternatively be used as an iterative creative discussion tool with a 3D interface for brand work, decorating, selecting, and determining brand design, store-fronts, and/or for use as any other suitable tool to otherwise generate concepts. For example, in the pre-production phase of a game and a game environment, a team of artists or concept developers as well as game directors and world builders may come together, either in VR or in a video conferencing setting or together in a room with a screen, to discuss the look and feel of the game or brand they are building. The system may allow this team to implement a quick iteration approach to facilitate and visualize the conversation. For example, the system may receive input from one or more members of the team to execute the semantic recommendation engine, where 3D assets or 2D images may be selected and presented to everyone in the virtual meeting (or in-person meeting), based on their input to the system and new searches that emerge from conversation. In some embodiments, members of the team might come to the meeting with already "primed" semantic maps that influence the 3D assets they place into the scene, meaning they show their own vision and how it might contrast with another's vision, and showing such a contrast can facilitate a discussion around influences and make aligned and informed style choices that help the overall vision.

In some embodiments, the system may perform context analysis of concept art. For example, if the system can be primed by 3D objects that are placed in a scene, it could also be influenced by concept art or images from, for example, block outs (e.g., a technique for creating first drafts of a world or level design) that are also accompanied by concept art or description of the environment in game design and development. For example, the system may be able to rely on only the pixels (or voxels), as it may not be able to obtain the same level of metadata from the 3D assets (e.g., size, tags, material names, previously searched terms), but the system may still use image recognition to generate a best prediction of themes and styles that start to put together the semantic map. Such best prediction may be then expanded upon and iterated through user interaction during the continued design of the world and based off of user selection from the 3D asset candidates being presented. If fed into the semantic map, the 3D asset candidates may become the starting point for priming the suggestion engine and starting to lead the 3D artists and world builders into a context, and the 3D models could also be used in a visual session together with 2D artists in pre-production to set and refine the context for future 3D work.

Figure 9A:
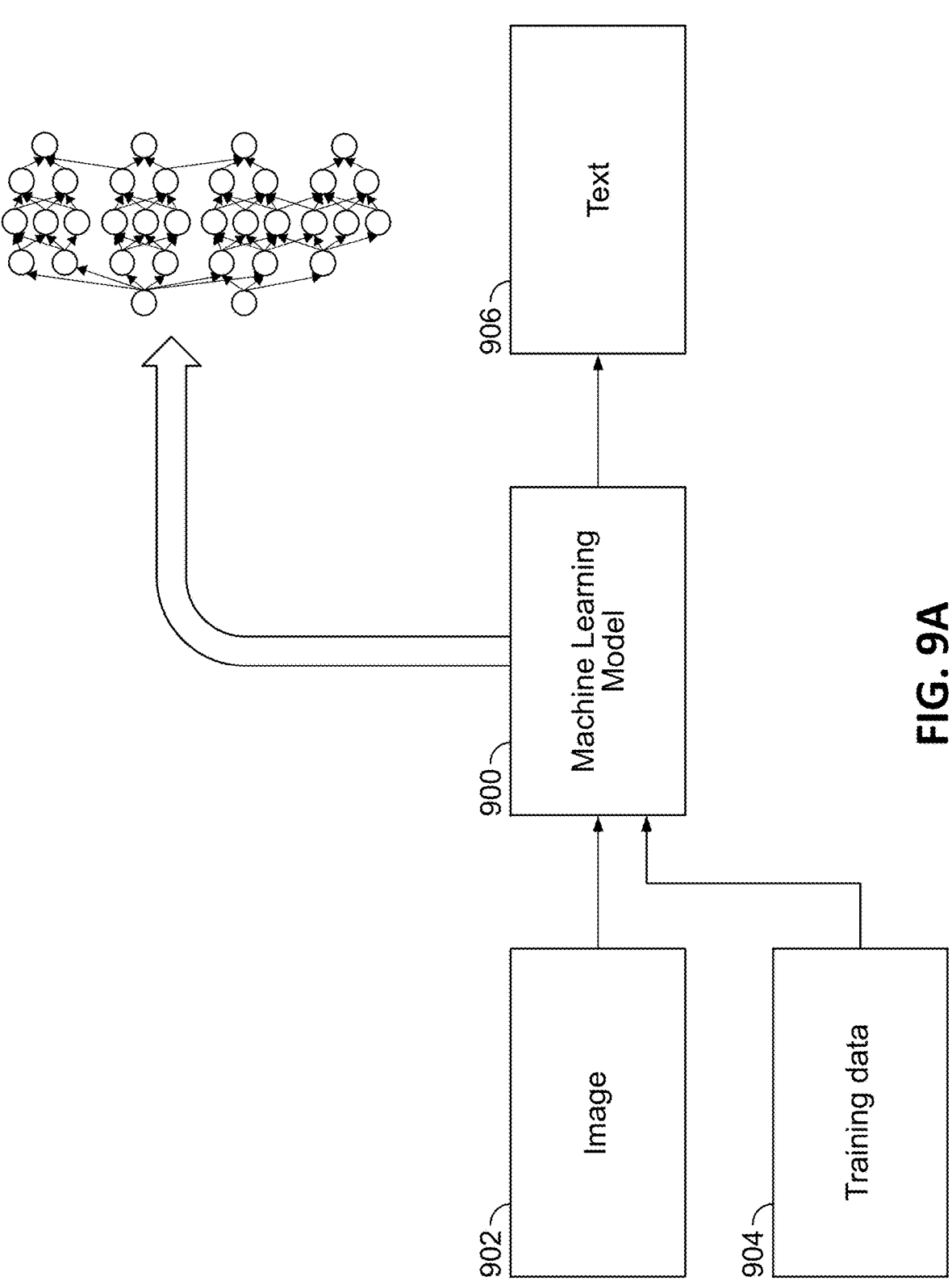
FIGS. 9A-9B show block diagrams of illustrative machine learning models, in accordance with some embodiments of this disclosure.
Figure 9B:
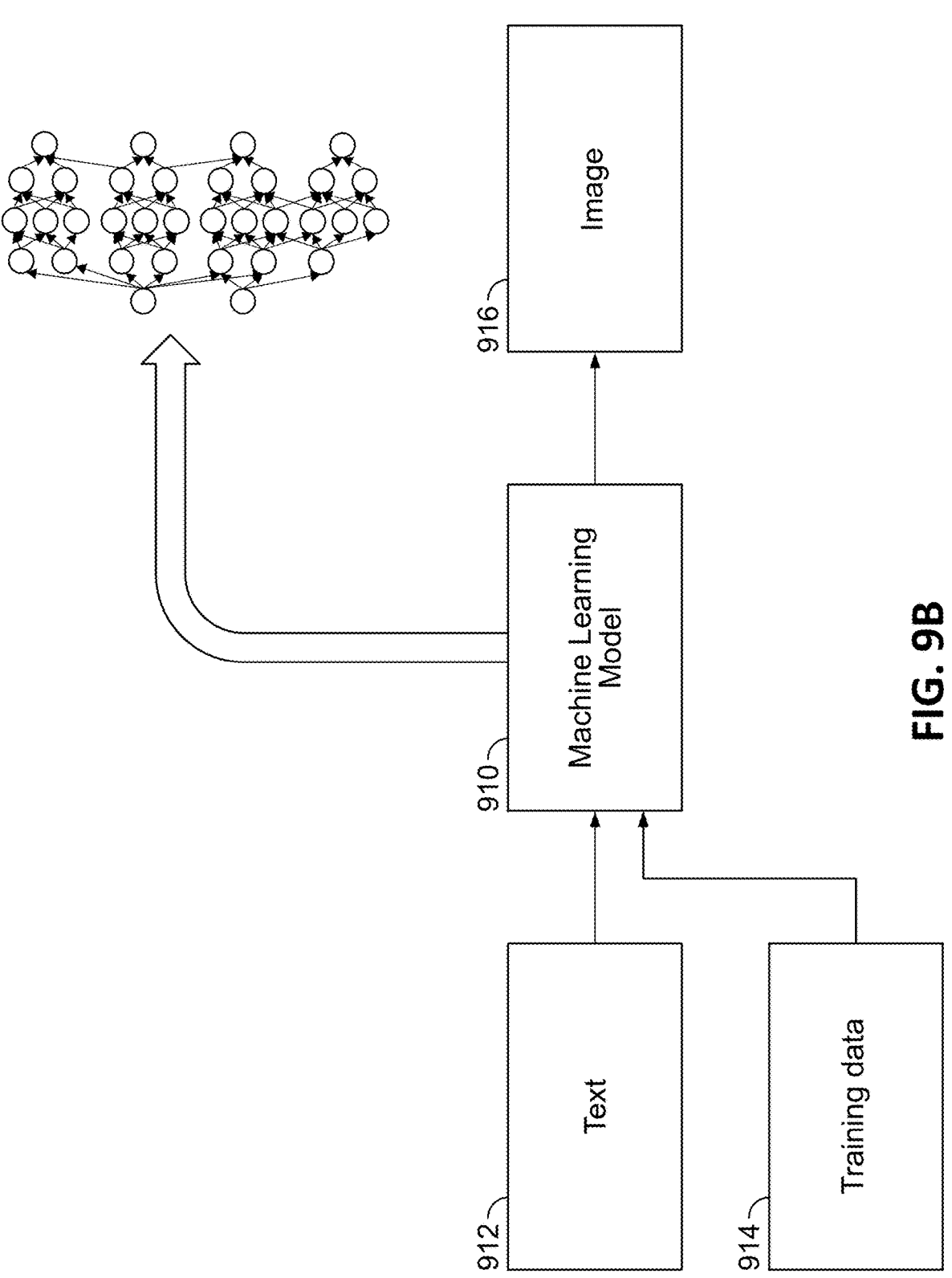

FIGS. 9A-9C show block diagrams of illustrative machine learning models 900 and 910, in accordance with some embodiments of this disclosure. In some embodiments, machine learning models 900 and/or 910 of FIGS. 9A-9C may be, for example: an LLM; neural network; a recurrent neural network; a convolutional neural network; an image encoder; a text encoder; a transformer; a classifier; or any other suitable type of machine learning or artificial intelligence model; or any combination thereof.

In some embodiments, one or more of machine learning models 900 and/or 910 may be implemented based at least in part on the techniques described in Ramesh et al., "Zero-Shot Text-to-Image Generation," Proceedings of the 38th International Conference on Machine Learning, PMLR 139: 8821-8831, 2021," the contents of which is hereby incorporated by reference herein in its entirety. In some embodiments, one or more of machine learning models 900 and/or 910 may be implemented based at least in part on the techniques described in Ramesh et al. "Hierarchical text-conditional image generation with clip latents." arXiv preprint arXiv: 2204.06125 (2022), the contents of which is hereby incorporated by reference herein in its entirety. In some embodiments, one or more of machine learning models 900 and/or 910 may be implemented based at least in part on the techniques described in Radford et al., "Learning Transferable Visual Models From Natural Language Supervision," PMLR 139:8748-8763, 2021, the contents of which is hereby incorporated by reference herein in its entirety.

Machine learning model 900 may be configured to receive data associated with one or more images 902 (e.g., of one or more portions of a 3D environment), and based on such input(s), machine learning model 900 may output text 906 (e.g., a natural language description of the 3D environment). Such data associated with one or more images 902 may comprise one or more portions of the image, one or more attributes of the image, metadata of the image, a description of the image, numerical representation of the image, and/or other representation of the image, or any other suitable data, or any combination thereof. For example, machine learning model 900 may be trained using training data 904 to receive as input data corresponding to an image of 3D object 122 (e.g., a beach chair in FIG. 1B inserted into the 3D environment) and/or other portions of 3D environment 106 (e.g., palm trees 108 and/or the ocean and/or the sand, and output text, e.g., natural language description 120 of FIG. 1B. Training data 904 may comprise a large number of text-image pairs from one or more sources, e.g., the Internet. Natural language description 120 may be used to construct a context for the 3D environment and/or to query a 3D content library for recommended 3D objects.

As shown in FIG. 9B, machine learning model 910 may be configured to receive data associated with text 912 (e.g., one or more portions of the text corresponding to a 3D object, and/or metadata of, or a natural language description of, a 3D object, and/or a numerical representation thereof, or any other suitable data, or any combination thereof), and based on such input(s), machine learning model 910 may output image 916 (e.g., a 3D object corresponding to the input text 912). For example, machine learning model 910 may be a text-to-3D image machine learning model, such as, for example, a model provided by Masterpiece X, enabling the creation of assets with mesh, textures, and animations. Machine learning model 910 may comprise or correspond to a generative AI model that produces images based on natural language input. Machine learning model 910 may be a text-to-image model, a type of neural network that generates images based on a text prompt, such as a sentence or a paragraph describing the desired image to be generated. Training data 914 may comprise a large number of text-image pairs from one or more sources, e.g., the Internet.

In some embodiments, machine learning model 910 may comprise or correspond to an LLM that generates text in desired formats using text prompts as input, and/or the LLM may be trained to visually inspect pixels for use in its neural net to generate relevant text to what it digests both visually and in text, among other modalities. The LLM may be interconnected with other forms of AI to not just digest but also output pixels and combine many different types of input to create increasingly complex descriptions of what it "sees" or "hears," for example. This interconnection of abilities makes it possible to enable many features through standard API connections, providing a one stop shop for performing advanced analytics on a combination of visual, text and voice-to-text-input and for output of both visuals and adaptive text. With LLMs, prompting can at times be long and complex, and the system may generate very adaptable and accurate text instructions for a specific system. For example, a prompt may prime the LLM by explaining how an entire system works, which allows for the LLM to accurately adapt to its context. This means it has the ability to output robust and relevant text, commands and other data for precisely the intended context, including historical or new data about the user, rules, preferences or changes in the system.

The LLM may be prompted to generate search strings or keywords to filter out, or search within, a 3D content library, instead of (or in addition to) generating any graphics or 3D content. The system may use understanding of the 3D environment to present already existing 3D objects (AI-generated or retrieved from a library) as candidates for the user using its semantic understanding of the scene as a filter.

In some embodiments, machine learning models 900 and 910 may be generated using training data 904 and 914, e.g., using an iterative process of adjusting weights (and/or other parameters) for one or more layers of the machine learning model(s), based on comparing outputs during training to ground truth values (e.g., annotated indications of the correct or desired outputs for given input(s)). In some embodiments, the system may then adjust weights or other parameters of the machine learning models being trained based on how closely the output corresponds to the ground truth value. In some embodiments, the training process may be repeated until results stop improving or until a certain performance level is achieved (e.g., until 95% accuracy is achieved, or any other suitable accuracy level or other metrics are achieved).

Machine learning model 900 (and 910), input data 902 and 912, training data 904 (and 914), and/or outputs 906 and

916 may be stored at any suitable device(s) and/or server(s) of the system. Machine learning model 900 (and 910) may be implemented at any suitable device(s) and/or server(s) of the system.

In some embodiments, model 900 (and 910) may be trained to learn features and patterns with respect to particular features of image or text inputs (e.g., certain types or categories of images or text) and corresponding representations thereof. Such learned patterns and inferences may be applied to received data once model 900 (and 910) is trained. In some embodiments, the models may continue to be trained on the fly or may be adjusted on the fly for continuous improvement, based on input data and inferences or patterns drawn from the input data, and/or based on comparisons after a particular number of cycles and/or based on feedback received from a user. In some embodiments, model 900 (and 910) may be content-independent or content-dependent, e.g., may continuously improve with respect to certain types of content. In some embodiments, 900 (and 910) may comprise any suitable number of parameters.

In some embodiments, machine learning model 900 (and 910) may be trained by way of unsupervised learning, e.g., to recognize and learn patterns based on unlabeled data. In some embodiments, machine learning model 900 (and 910) may be trained by supervised training with labeled training examples to help the model converge to an acceptable error range, e.g., to refine parameters, such as weights and/or bias values and/or other internal model logic, to minimize a loss function. In some embodiments, each layer may comprise one or more nodes that may be associated with learned parameters (e.g., weights and/or biases), and/or connections between nodes may represent parameters (e.g., weights and/or biases) learned during training (e.g., using back-propagation techniques, and/or any other suitable techniques). In some embodiments, the nature of the connections may enable or inhibit certain nodes of the network. In some embodiments, the system may be configured to receive (e.g., prior to training) user specification of (or automatic selection of) hyperparameters (e.g., a number of layers and/or nodes or neurons in each model). The system may automatically set or receive manual selection of a learning rate, e.g., indicating how quickly parameters should be adjusted. In some embodiments, the training image data may be suitably formatted and/or labeled by human annotators or otherwise labeled via a computer-implemented process. As an example, such labels may be categorized metadata attributes stored in conjunction with or appended to the training image data. Any suitable network training patch size and batch size may be employed for training model 900 (and 910). In some embodiments, model 900 (and 910) may be trained at least in part using a feedback loop, e.g., to help learn user preferences over time.

In some embodiments, the system may perform any suitable pre-processing steps with respect to training data, and/or data to be input to the trained machine learning model. For example, pre-processing may include causing an image that is to be input to be of a particular size or resolution. In some embodiments, pre-processing may include causing text that is to be input to be of a particular size or format. In some embodiments, pre-processing may include, for example: extracting suitable features from the training images and converting the features into a suitable numerical representation (e.g., one or more vector(s) and/or one or more matrices); normalization; resizing; minimization; brightening portions thereof; darkening portions thereof; color shifting the image among color schemes from color to grayscale; other mapping; cropping the image;

scaling the image; adjusting an aspect ratio of the image; adjusting contrast of an image; and/or performing any other suitable operating on or manipulating of the image data; or any combination thereof. In some embodiments, the image capture system may pre-process image or text data to be input to the trained machine learning model, to cause a format of the input image or text data to match the formatting of the training data, or any other suitable processing may be performed, or any combination thereof.

In some embodiments, machine learning model 900 (and 910) may be trained "offline," such as, for example, at a server (e.g., server 1104 of FIG. 11) remote from a computing device at which input is received, or at a third party. In some embodiments, model 200 may be implemented at such remote server, and/or abstracted by the system (for example, as a set of weights or biases applied to a neural network) and transmitted (e.g., over network 1109 of FIG. 11) to a user's computing devices, e.g., having the system installed or implemented thereon or provided thereto. For example, the local computing device may lack computational and/or storage resources to train the model from scratch. In some embodiments, each device may iteratively improve the machine learning model 900 (and 910) locally and send the abstracted model and/or updates back to the server. In some embodiments, the user's computing devices may be configured to locally implement machine learning model 900 (and 910).

Figure 10:
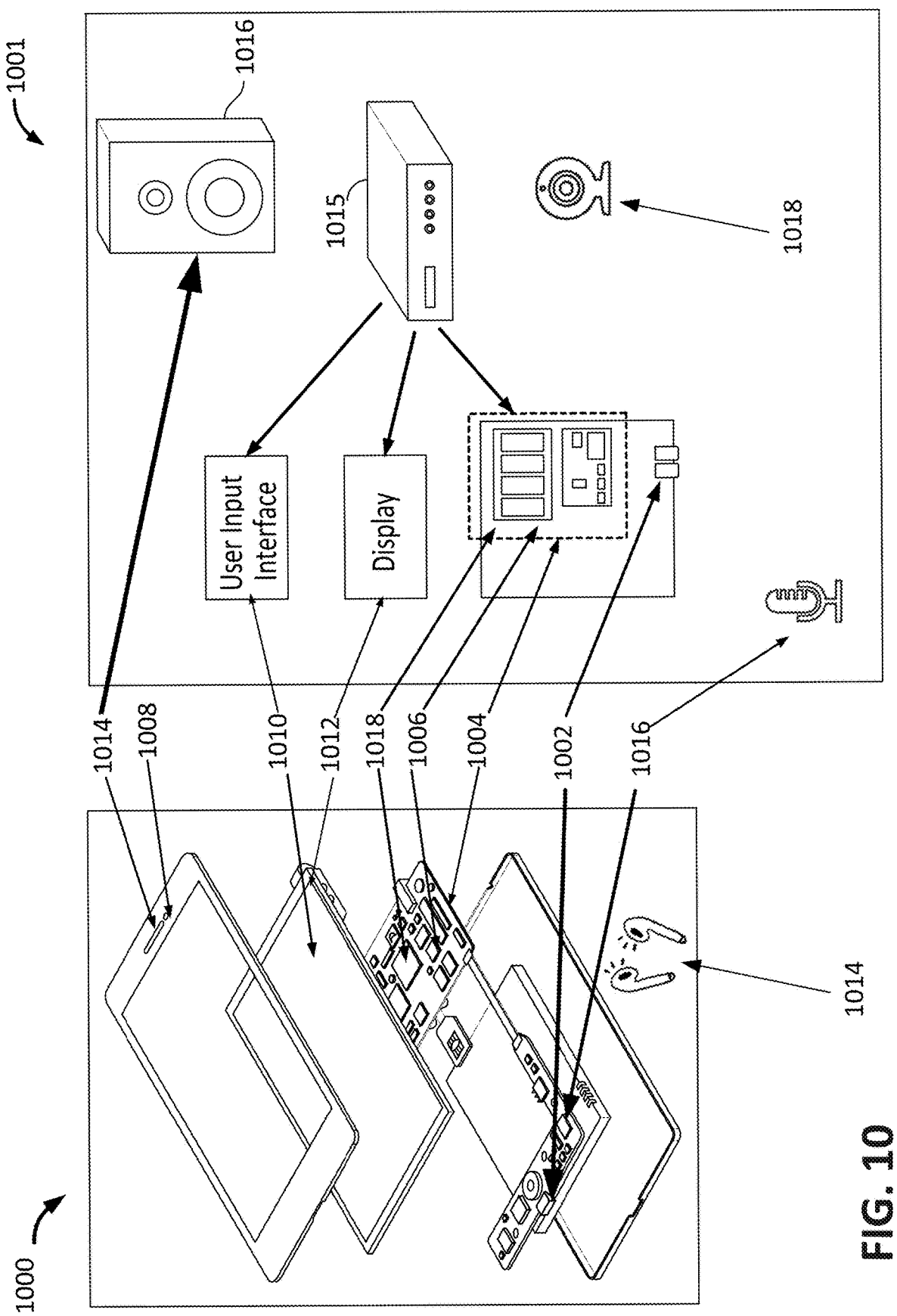
FIGS. 10-11 show illustrative devices and systems for providing recommendations for 3D objects for insertion into a 3D environment, in accordance with some embodiments of this disclosure.
Figure 11:
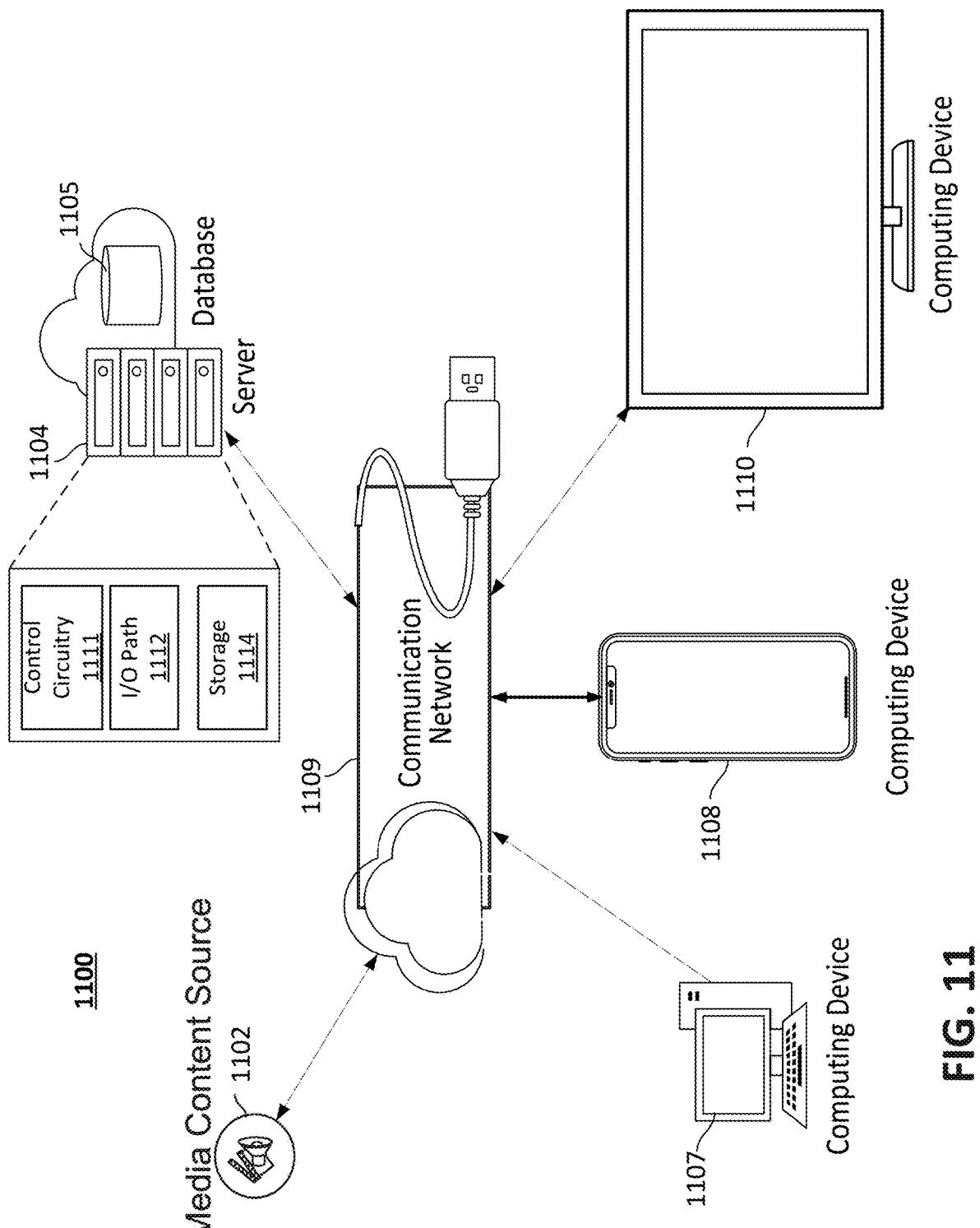

FIGS. 10-11 show illustrative devices, systems, servers, and related hardware for generating a multi-layer image, in accordance with some embodiments of this disclosure. FIG. 8 shows generalized embodiments of illustrative computing devices 1000 and 1001, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR HMD; a VR HMD; or any other suitable computing device; or any combination thereof. In another example, computing device 1001 may be a user television equipment system or device.

User television equipment device 1001 may include set-top box 1015. Set-top box 1015 may be communicatively connected to microphone 1016, Audio output equipment (e.g., speaker or headphones 1014), and display 1012. In some embodiments, microphone 1016 may receive audio corresponding to a voice of a user providing input. In some embodiments, display 1012 may be a television display or a computer display. In some embodiments, set-top box 1015 may be communicatively connected to user input interface 1010. In some embodiments, user input interface 1010 may be a remote control device. Set-top box 1015 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 11. In some embodiments, computing device 1000 may comprise any suitable number of sensors (e.g., gyroscope or accelerometer, etc.), and/or a GPS module (e.g., in communication with one or more servers and/or cell towers and/or satellites) to ascertain a location of computing device 1000. In some embodiments, computing device 1000 comprises a rechargeable battery that is configured to provide power to the components of the device.

Each one of computing device 1000 and computing device 1001 may receive content and data via input/output (I/O) path 1002. I/O path 1002 may provide content (e.g., broadcast programming, on-demand programming, Internet content, content available over a local area network (LAN) or wide area network (WAN), and/or other content) and data to control circuitry 1004, which may comprise processing circuitry 1006 and storage 1008. Control circuitry 1004 may be used to send and receive commands, requests, and other suitable data using I/O path 1002, which may comprise I/O circuitry. I/O path 1002 may connect control circuitry 1004 (and specifically processing circuitry 1006) to one or more communications paths (described below). I/O functions may be provided by one or more of these communications paths, but are shown as a single path in FIG. 10 to avoid over-complicating the drawing. While set-top box 1015 is shown in FIG. 3 for illustration, any suitable computing device having processing circuitry, control circuitry, and storage may be used in accordance with the present disclosure. For example, set-top box 1015 may be replaced by, or complemented by, a personal computer (e.g., a notebook, a laptop, a desktop), a smartphone (e.g., computing device 1000), an XR device; a tablet; a network-based server hosting a user-accessible client device; a non-user-owned device; any other suitable device; or any combination thereof.

Control circuitry 1004 may be based on any suitable control circuitry such as processing circuitry 1006. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for the system or application stored in memory (e.g., storage 1008). Specifically, control circuitry 1004 may be instructed by the system or application to perform the functions discussed above and below. In some implementations, processing or actions performed by control circuitry 1004 may be based on instructions received from the system or application.

In client/server-based embodiments, control circuitry 1004 may include communications circuitry suitable for communicating with a server or other networks or servers. The system or application may be a stand-alone application implemented on a device or a server. The system or application may be implemented as software or a set of executable instructions. The instructions for performing any of the embodiments discussed herein of the system or application may be encoded on non-transitory computer-readable media (e.g., a hard drive, random-access memory on a DRAM integrated circuit, read-only memory on a BLU-RAY disk, etc.). For example, the instructions may be stored in storage 1008, and executed by control circuitry 1004 of a computing device 1000.

In some embodiments, the system or application may be a client/server application where only the client application resides on device 1000 (e.g., device 104), and a server application resides on an external server (e.g., server 1104). For example, the system or application may be implemented partially as a client application on control circuitry 1004 of device 1000 and partially on server 1104 as a server application running on control circuitry 1111. Server 1104 may be a part of a local area network with one or more of computing devices 1000, 1001 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 1104 and/or an edge computing device), referred to as "the cloud." Device 1000 may be a cloud client that relies on the cloud computing capabilities from server 1104 to determine whether processing (e.g., at least a portion of virtual background processing and/or at least a portion of other processing tasks) should be offloaded from the mobile device, and facilitate such offloading. When executed by control circuitry of server 1104, the system or application may instruct control circuitry 1111 to perform processing tasks for the client device and facilitate the generation of multi-layer images. The client application may instruct control circuitry 1004 to determine whether processing should be offloaded. In some embodiments, data structure 112 of FIGS. 1A-1C may be located at server 1104 and/or database 1105 and/or at computing device 1107, 1108 and/or 1110.

Control circuitry 1004 may include communications circuitry suitable for communicating with a server, edge computing systems and devices, a table or database server, or other networks or servers The instructions for carrying out the above mentioned functionality may be stored on a server (which is described in more detail in connection with FIG. 11. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 11). In addition, communications circuitry may include circuitry that enables peer-to-peer communication of computing devices, or communication of computing devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as the system or application data described above. Nonvolatile memory may also be used (e.g., to launch a boot-up routine and other instructions). Cloud-based storage, described in more detail in relation to FIG. 11, may be used to supplement storage 1008 or instead of storage 1008.

Control circuitry 1004 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 1004 may also include scaler circuitry for upconverting and downconverting content into the preferred output format of computing device 1000. Control circuitry 1004 may also include digital-to-analog converter circuitry and analog-to-digital converter circuitry for converting between digital and analog signals. The tuning and encoding circuitry may be used by computing device 1000, 1001 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from computing device 1000, the tuning and encoding circuitry (including multiple tuners) may be associated with storage 1008.

Control circuitry 1004 may receive instruction from a user by way of user input interface 1010. User input interface 1010 may be any suitable user interface, such as a remote control, mouse, trackball, keypad, keyboard, touchscreen, touchpad, stylus input, joystick, voice recognition interface, or other user input interfaces. Display 812 may be provided as a stand-alone device or integrated with other elements of each one of computing device 1000 and computing device 1001. For example, display 1012 may be a touchscreen or touch-sensitive display. In such circumstances, user input interface 1010 may be integrated with or combined with display 1012. In some embodiments, user input interface 1010 includes a remote-control device having one or more microphones, buttons, keypads, any other components configured to receive user input or combinations thereof. For example, user input interface 1010 may include a handheld remote-control device having an alphanumeric keypad and option buttons. In a further example, user input interface 1010 may include a handheld remote-control device having a microphone and control circuitry configured to receive and identify voice commands and transmit information to set-top box 1015.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of computing device 1000 and computing device 1001 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 1004 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words or terms or numbers that are received by the microphone and converted to text by control circuitry 1004. In a further example, a user may voice commands that are received by a microphone and recognized by control circuitry 1004. Camera 1018 may be any suitable video camera integrated with the equipment or externally connected. Camera 1018 may be a digital camera comprising a charge-coupled device (CCD) and/or a complementary metal-oxide semiconductor (CMOS) image sensor. Camera 1018 may be an analog camera that converts to digital images via a video card.

The system or application may be implemented using any suitable architecture. For example, it may be a stand-alone application wholly-implemented on each one of computing device 1000 and computing device 1001. In such an approach, instructions of the application may be stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to provide the functionality, and generate any of the displays, discussed herein. Based on the processed instructions, control circuitry 1004 may determine what action to perform when input is received from user input interface 1010. For example, movement of a cursor on a display up/down may be indicated by the processed instructions when user input interface 1010 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1004 may allow a user to provide user profile information or may automatically compile user profile information. For example, control circuitry 1004 may access and monitor network data, video data, audio data, processing data, historical interactions by the user, and/or any other suitable data. Control circuitry 1004 may obtain all or part of other user profiles that are related to a particular user (e.g., via social media networks), and/or obtain information about the user from other sources that control circuitry 1004 may access. As a result, a user can be provided with a unified experience across the user's different devices.

In some embodiments, the system or application is a client/server-based application. Data for use by a thick or thin client implemented on each one of computing device 1000 and computing device 1001 may be retrieved on-demand by issuing requests to a server remote to each one of computing device 1000 and computing device 1001. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on computing device 1000. This way, the processing of the instructions is performed remotely by the server while the resulting displays (e.g., that may include text, a keyboard, or other visuals) are provided locally on computing device 1000. Computing device 1000 may receive inputs from the user via input interface 310 and transmit those inputs to the remote server for processing and generating the corresponding displays. For example, computing device 1000 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 1000 for presentation to the user.

In some embodiments, the system or application may be downloaded and interpreted or otherwise run by an interpreter or virtual machine (run by control circuitry 1004). In some embodiments, system or application may be encoded in the ETV Binary Interchange Format (EBIF), received by control circuitry 1004 as part of a suitable feed, and interpreted by a user agent running on control circuitry 1004. For example, the system or application may be an EBIF application. In some embodiments, the system or application may be defined by a series of JAVA-based files that are received and run by a local virtual machine or other suitable middleware executed by control circuitry 1004. In some of such embodiments (e.g., those employing MPEG-2, MPEG-4, HEVC or any other suitable digital media encoding schemes), the system or application may be, for example, encoded and transmitted in an MPEG-2 object carousel with the MPEG audio and video packets of a program.

FIG. 11 is a diagram of an illustrative system 1100 for providing recommendations for 3D objects for insertion into a 3D environment, in accordance with some embodiments of this disclosure. Computing devices 1107, 1108, 1110 (which may correspond to, e.g., computing device 1000 or 1001) may be coupled to communication network 1109. Communication network 1109 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1109) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 11 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 1109.

System 1100 may comprise media content source 1102, one or more servers 1104, and/or one or more edge computing devices. In some embodiments, system or application may be executed at one or more of control circuitry 1111 of server 1104 (and/or control circuitry of computing devices 1107, 1108, 1110 and/or control circuitry of one or more edge computing devices). In some embodiments, the media content source and/or server 1104 may be configured to host or otherwise facilitate video communication sessions between computing devices 1107, 1108, 1110 and/or any other suitable computing devices, and/or host or otherwise be in communication (e.g., over network 1109) with one or more social network services.

In some embodiments, server 1104 may include control circuitry 1111 and storage 1114 (e.g., RAM, ROM, Hard Disk, Removable Disk, etc.). Storage 1114 may store one or more databases. Server 1104 may also include an input/output path 1112. I/O path 1112 may provide 3D object data, context data for the 3D environment, natural language descriptions, machine learning model inputs and/or outputs, device information, or other data, over a local area network (LAN) or wide area network (WAN), and/or other content and data to control circuitry 1111, which may include processing circuitry, and storage 1114. Control circuitry 1111 may be used to send and receive commands, requests, and other suitable data using I/O path 1112, which may comprise I/O circuitry. I/O path 1112 may connect control circuitry 1111 (and specifically control circuitry) to one or more communications paths.

Control circuitry 1111 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1111 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1111 executes instructions for an emulation system application stored in memory (e.g., the storage 1114). Memory may be an electronic storage device provided as storage 1114 that is part of control circuitry 1111.

FIG. 12 is a flowchart of a detailed illustrative process 1200 for providing recommended 3D objects for a 3D environment, in accordance with some embodiments of this disclosure. In various embodiments, the individual steps of process 1200 may be implemented by one or more components of the devices, methods, and systems of FIGS. 1-11 and may be performed in combination with any of the other processes and aspects described herein. Although the present disclosure may describe certain steps of process 1200 (and of other processes described herein) as being implemented by certain components of the devices, methods, and systems of FIGS. 1-11, this is for purposes of illustration only, and it should be understood that other components of the devices, methods, and systems of FIGS. 1-11 may implement those steps instead.

At 1202, control circuitry (e.g., control circuitry 1004 of FIG. 10 and/or control circuitry 1111 of FIG. 11) and/or I/O circuitry (e.g., 1002 of FIGS. 10 and/or 1112 of FIG. 11), may provide for display a user interface (e.g., user interface 100 of FIGS. 1A-1C) to facilitate creation of a 3D environment. At 1204, the control circuitry may generate a 3D environment (e.g., 3D environment 106 of FIG. 1A) based on inputs received from one or more users via the user interface (e.g., via voice command, a transcript of which may be obtainable via an API and/pr using natural language processing techniques); touch input; text input; mouse click; biometric input; or any other suitable input; or any combination thereof). In some embodiments, the received user inputs may be in the form of keyword searches and subsequent browse and object import and/or selection.

At 1206, the control circuitry may determine whether a single user is, or multiple users are, currently (or previously) synchronously or asynchronously providing inputs instructing the system to construct the 3D environment. For example, the control circuitry may check whether certain user profiles are active in relation to a particular 3D environment creation user interface. If only a single user is associated with the creation of the 3D environment, processing may proceed to 1208; otherwise processing may proceed to 1210.

At 1208, the control circuitry may perform visual processing of the 3D environment to obtain a natural language description of the 3D environment. For example, the control circuitry may analyze one or more portions and/or one or more objects currently present in the 3D environment (e.g., 3D environment 106), such as, for example, the ocean, palm trees 108, the sand, and the sky, to generate "beach with palm trees, sand, ocean and sky" as natural language description 110. In some embodiments, the natural language description may be generated in part based on metadata of 3D objects in the 3D environment. For example, palm trees 108 may have been retrieved from a 3D content library database of 3D assets with relevant metadata and object category (e.g., "furniture," or "beach" or "nature"). In some embodiments, the control circuitry may generate the natural language description for one or more portions of the 3D environment by inputting data indicative of visual elements of such portion(s) to a machine learning model (e.g., machine learning model 900 of FIG. 9A) to obtain the natural language description based on output from such machine learning model.

At 1210, the control circuitry may, based at least in part on the natural language description generated at 1208, determine a context of the 3D environment and store such context in a data structure (e.g., data structure 112 of FIG. 1A). For example, the control circuitry may analyze user inputs to generate a semantic representation of the current scene, to determine the context. The context may correspond to a single natural language description for the 3D environment, or multiple natural language descriptions associated with the 3D environment (e.g., stored at data structure 112) may be merged to determine the context for the 3D environment. In some embodiments, the multiple natural language descriptions may be weighted equally when merging the multiple natural language descriptions to determine the context, or certain natural language descriptions may be weighted more heavily than others. For example, the system may determine that a natural language description for a 3D object having certain characteristics should contribute more to the overall context of 3D environment 106 than other objects in 3D environment 106. For example, such characteristic may be that the 3D object was most recently inserted into 3D environment 106 relative to other objects in the 3D environment; is currently in a FOV of computing device 104; is more currently more clearly visible or is more fully depicted than other objects in the 3D environment; is larger in size, or positioned more prominently (e.g., in a foreground) in the 3D environment, relative to other objects (e.g., smaller or in the background) in the 3D environment; matches preferences indicated in a user profile of user 102 more closely than other 3D objects in the 3D environment; or may be based on any other suitable characteristic, or any combination thereof). Based on one or more of such characteristics, the system may determine that the 3D object contributes more to the overall context of 3D environment 106 than other objects in 3D environment 106. In some embodiments, metadata associated with inserted objects may be stored in a 3D content library (e.g., at data structure 112 or at any other suitable data store), and the system may determine a context of the 3D environment based at least in part on the metadata. In some embodiments, the context may be stored as a semantic map or a semantic map, e.g., based on a low of searches, prompts and visual inspections that build the semantic map over time.

In some embodiments, the control circuitry employs a semantics engine having access to already available metadata about the 3D objects in the 3D scene and can enhance the context specifications by using this metadata as another input. In some embodiments, the user provides natural language input (text or speech) to the semantics engine about the intended context to potentially shorten the time for a context specification (understanding of the theme) to be established, and the context specification may then be processed in combination with imported 3D assets.

At 1212, the control circuitry may, having determined that multiple users have contributed to the 3D environment, perform visual processing for a first portion of the 3D environment that a first user provided inputs for its creation, and perform visual processing for a second portion of the 3D environment that a second user provided inputs for its creation. For example, the control circuitry may retrieve a list of inputs received in relation to a particular 3D environment to determine which users requested which portions of the 3D environment to be constructed. At 1214, the control circuitry may determine a first context for such first portion, a second context for such second portion, and an overall context for the 3D environment. In some embodiments, there may be an overall 3D world context that applies to each of the sub-contexts (e.g., the world context may be "1700s" and a first sub-context for the first portion may relate to a newly constructed building in the 1700s while a second sub-context for the second portion may relate to a dilapidated building in the 1700s).

At 1216, the control circuitry may query a 3D content library, based on the natural language description(s), e.g., generated at 1210 or at 1214. For example, after performing the visual semantic understanding of the 3D scene, the control circuitry may cause the natural language description(s) to be fed into a search API of a 3D content library to generate new search results. In some embodiments, one or more 3D content libraries may be queried, including a wide range of objects, materials, and environments, each with detailed metadata. For example, each 3D object in the database may be tagged with relevant metadata related to the 3D object's category (e.g., "furniture," and "nature"); materials (e.g., "wood," "stone"); themes (e.g., "forest," "urban"), and other characteristics (e.g., "high-poly," "low-poly"). In some embodiments, tags can be assigned manually and/or may be generated through automated processes like image recognition upon scanning the 3D asset. For example, at 1216, using the tags as input and an API to the 3D asset library, the keywords may be presented to the libraries search engine to generate relevant search results to present as candidates, where such candidates may be 3D assets determined to likely be of interest to one or more users (world builder) for placing in the scene.

In some embodiments, the voice of the user can drive generation of tags that are created. For example, the 3D content library may provide an API that allows external systems to access and search the database through natural language processing from the user (using descriptive sentences instead of just keywords), and the LLM can construct (prompted or guided by rules) either tags or even more detailed descriptions of the 3D object, texture material choice, and/or any other suitable tags. In some embodiments, a context description of the scene may be paired that together with a search query of the user, which then in combination prompts the search of the library.

In some embodiments, the library may be searchable by way of the LLM, which may output precise search results with more descriptive and precise text, e.g., the LLM might construct queries like: "Find high-poly trees suitable for a forest scene," "Retrieve low-poly furniture models made of wood," "Search for urban-themed building textures" and additional depth can be added based on user settings. An LLM might take or generate one such description and then expand on it to make it more precise and accurate, e.g., an LLM may prompt itself to generate a more detailed prompt. In some embodiments, the API may be integrated directly into popular 3D modelling and rendering software, allowing users to search for and import 3D objects seamlessly within their design environment, to present a search to the user in a fluent manner leveraging LLMs, giving users the opportunity to stay in flow and create the world rather than get stuck in potentially hard-to-navigate menus in or outside of the 3D environment.

At 1218, the control circuitry may determine whether the natural language query associated with the current context is sufficiently similar to one or more 3D objects in the queried 3D content library. In some embodiments, the search results are the results that the search engine first presents the system with, and the process of filtering and selecting the presentable candidates is carried through a second layer of visual inspection to generate the candidates. Such secondary inspection on returned assets in question may enable assessment of how well such assets are within the parameters of the user settings and current semantic map, to help select the best fit for the parameters as a candidate (and/or eliminate that specific asset from being included in the next search), then repeat the process to generate the next candidate. As discussed, for instance, in relation to FIG. 7, in some embodiments, the control circuitry may generate a synchronicity score, to determine whether a 3D object in the library is sufficiently similar to the current context. Such score may be based on, for example, whether a threshold number of common or related terms associated with the current context overlap with common or related terms associated with metadata of the 3D object in the 3D content library. In some embodiments, image data (e.g., pixels or voxels) of portions of the current 3D scene may be compared to image data in the 3D content library, to identify sufficiently similar assets to the current context. In some embodiments, a vector may be generated for each 3D object in the library indicative of its textual description and/or image characteristics, and compared to a vector for the textual description and/or image characteristics of a current 3D scene, to determine whether there is sufficient similarity. For example, 3D objects and/or 3D images may be converted to vectors represented in multidimensional space to determine their relevance or similarity to vectors of other 3D objects and/or 3D images, based on a proximity in the multidimensional space. Such vector representation may be used to input data to and/or train one or more of the machine learning models described herein, and/or in identifying candidate 3D object recommendations based on a current context of a 3D scene.

At 1220, having determined that one or more 3D objects in one or more queried 3D content libraries are sufficiently similar to the current context of the current 3D environment, the control circuitry may provide for display a selectable option to add a recommended 3D object to the 3D environment. For example, as shown in FIG. 1B, each of the portions of user interface 100 at which recommended 3D objects 124, 114, and 118 are displayed may be selectable to insert the corresponding 3D object into 3D environment 106. For example, such candidates may be presented to the user after additional visual filtering. The control circuitry may keep track of 3D assets most relevant to the user, iterate over historical data to generate relevant search terms (tags) that can match the theme that the artist is determined to be interested in for in any given project, and to present to the user relevant 3D assets. In some embodiments, 3D assets that closely match the query criteria are presented on top of the other recommendations, or otherwise prominently in relation to the other recommendations. In some embodiments, matching 3D assets may be generated, e.g., by a machine learning model receiving input of the relevant context, or retrieved from any suitable source.

In some embodiments, the control circuitry may, upon determining that multiple users are providing inputs to construct the 3D environment, provide different 3D object recommendations to the different users based on their respective contexts. In some embodiments, recommendations provided to the user may vary based on the FOV, e.g., based on in which position the recommended object is likely to be placed. For example, if 3D objects inserted by a first user working on a 3D world are associated with a context of outer space, and 3D objects inserted by a second user working on the 3D world are associated with a context of the ocean, as the position in the 3D world at which the next 3D object is likely to be inserted moves towards the boundary between such portions of the 3D world, the system may suggest an object (e.g., a rocket) traveling from outer space to the ocean, since such object shares commonalities with each context. The control circuitry may automatically update the search field with relevant suggestions rather than depending on the 3D artist to do the searching manually, to enable the artist to select the most relevant 3D objects directly inside the VR environment.

At 1222, if one or more 3D objects in one or more queried 3D content libraries are not sufficiently similar to the current context of the current 3D environment, the control circuitry may determine whether one or more of such 3D objects in the one or more queried 3D content libraries are at least partially similar to the current context and/or current natural language description of the current 3D environment. For example, the control circuitry may identify a partially matching 3D object (e.g., differing more in material of the 3D object than other elements of appearance, or sharing some common terms in its metadata or visual elements but below a threshold number of common terms or visual elements). At 1224, the control circuitry modifies such partially matching 3D object (and/or combines 3D objects in the library or already inserted in the 3D world) to more closely conform to the current context of the 3D environment. For example, the control circuitry may employ a generative machine learning model to produce such modified version of the partially matching 3D object.

At 1226, the control circuitry may receive input to insert a 3D object into the 3D environment and cause insertion of the 3D object. For example, as shown in FIG. 1B, 3D object 122 may be inserted into 3D environment 106, after being presented as a recommendation to the user in FIG. 1A at 114. After receiving one or more of such selections, the process may return to 1204, after which the control circuitry may eventually proceed to 1208 and/or 1212 to determine an updated context in light of the newly added 3D object at 1226. Such features may enable users to receive more refined suggestions over time based on their current work item and the overall context as understood by the system, by providing an iterative loop to establish the context through which more accurate recommendations are generated, to create a more seamless experience of obtaining a relevant 3D asset for the user before he or she even asks for it. The control circuitry may enable 3D (e.g., voxels, and/or pixels) search and combine other sources of metadata in the 3D files, including their properties of editing, to present recommendations of an optimum fit for the user's 3D environment while also keeping the user in a creative flow.

In some embodiments, the semantic map may be updated dynamically based on the choice of the user, and after the search has taken place, the same image analysis system that built the semantic context from analyzing the pixel outputs from the scene may be used to filter the search results. Many 3D models may be identified upon a search, and filtered based on a combination of the user preferences and the data already gathered in the semantic map.

While the process of FIG. 12 is described as being triggered by a user, this same visual input and search can occur automatically if the system is permitted to iteratively update the search queries in runtime through the API, e.g., using the virtual camera as input. For example, the pixels from the virtual camera may become the search input based at least in part on identifications performed by the LLM. The output description may be then iterated upon in multiple steps and filtered through user settings to arrive at the output that is the 3D assets most likely to be in line with what the user requested.

In some embodiments, the control circuitry may manage how and if a user should be alerted when a specific 3D object is placed in the scene to warn them about a 3D asset that may be outside the context specification held by the system for that specific area. For example, the control circuitry checks the ruleset of the system user, context based on the region on the map and user settings to decide if the user should be warned about a 3D asset being mismatched with the context. Such input may be retrieved from the semantic map. If the user places a 3D asset in the 3D environment determined to be outside of the context and/or user settings, a warning may be displayed showing the matching score of the placed asset. This score may also be accompanied alongside an LLM-generated message that may explain why this particular asset is inappropriate for the current 3D environment and/or is disqualified. This input can come from the global settings of the system based on the thresholds (acceptance levels of synchronization scores), which may be default values or may be dynamically setup or broadened or narrowed as the system learns the constraints of the thematic context as work progresses.

In some embodiments, these alerts (warnings displayed in the UI provided by the game engine) can then provide the world designer with a set of options to remove the 3D asset, read more information about the error or go to the global or area settings to modify the thresholds of the system or load a different context file for their own use. The user may also choose to ignore the message and continue world building. The subsequent choices can then refine (broaden or narrow) the scope of the context as the system is programmed to adjust if, for example, the world builder dismissed the message and kept adding 3D models.

In some embodiments, with the setup of an image and object recognition algorithm reading pixels on a screen to extract a context, there are many inputs that can contribute to that context, e.g., which may be pixel- or voxel-based. The virtual camera can be used to look into the 3D scene and understand its context as the world is being built around it, and the same pixels and metadata (from 3D assets) can be extracted from already-placed 3D objects of a scene. This may enable the control circuitry to load a scene that has already been designed and use the 3D content placed in it to feed and pre-load (e.g., prime) the system to create a semantic map based on this already-created scene. Such features may enable creation of the next scene or creation of contrasting new regions based on this primed data. For example, a user might ask the system to read (as one of the inputs) a sci-fi scene, and, using any attached LLM API, ask what barstools would fit a saloon that the user is about to build in a desert. Such inputs may be fed to the semantic map and used to suggest a specific asset and/or a degree of wear and tear and/or consider sand and dust would permeate into the saloon. Such data may be filtered through the semantic map's global user settings, such as to arrive at assets that are both in line with the specification from the user and the stylistic context set at the start of the design process of the game or virtual environment. The context may also be influenced by any data that can be extracted from any story elements described in the game design and development, e.g., if fed to the LLM.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
   providing for display, via a head-mounted display (HMD), a user interface to facilitate creation of a three-dimensional (3D) environment;
   based on one or more inputs received via the user interface, generating the 3D environment, wherein the 3D environment comprises a particular 3D object;
   performing visual processing of the 3D environment to obtain a natural language description of the 3D environment, wherein the natural language description of the 3D environment comprises a natural language description of the particular 3D object;
   determining a context of the 3D environment based at least in part on the natural language description of the 3D environment;
   storing the context in a data structure;
   querying a 3D content library, based on the natural language description of the 3D environment, to identify at least one recommended 3D object that is relevant to the stored context of the 3D environment, wherein the 3D content library comprises a plurality of 3D objects and associated natural language descriptions, wherein the plurality of 3D objects comprises the particular 3D object, and wherein identifying the at least one recommended 3D object that is relevant to the stored context of the 3D environment is based on determining that the natural language description of the particular 3D object corresponds to the natural language description of the at least one recommended 3D object; and
   providing for display, at the user interface of the HMD, one or more selectable options to add the at least one recommended 3D object to the 3D environment.

2. The method of claim 1, wherein:
   at a first time, the 3D environment includes a first 3D object, the natural language description of the 3D environment comprises a first natural language description for the first 3D object, and an initial context of the 3D environment is determined based on the first natural language description; and
   the method further comprises:
      at a second time later than the first time, receiving an input to add a second 3D object to the 3D environment;
      adding the second 3D object to the 3D environment and obtaining a second natural language description for the second 3D object;
      determining an updated initial context of the 3D environment based on the first natural language description and the second natural language description, and storing the updated initial context at the data structure;
      querying the 3D content library, based on the first and second natural language descriptions of the 3D environment, to identify a particular 3D object that is relevant to the stored updated initial context of the 3D environment; and
      providing for display, at the user interface, a recommendation to add the particular 3D object to the 3D environment.

3. The method of claim 1, wherein:
   the 3D content library comprises metadata stored in association with the plurality of 3D objects; and
   determining the context of the 3D environment is further based at least in part on the metadata stored in association with the particular 3D object in the 3D content library.

4. The method of claim 1, wherein performing the visual processing of the 3D environment to obtain a natural language description of the 3D environment comprises:
   inputting one or more attributes of the 3D environment into a machine learning model; and
   receiving, as output from the machine learning model based on the one or more attributes, the natural language description of the 3D environment.

5. The method of claim 4, wherein inputting the one or more attributes of the 3D environment into the machine learning model comprises inputting data associated with the particular 3D object of the 3D environment into the machine learning model; and wherein the natural language description of the 3D environment output by the machine learning model comprises the natural language description of the particular 3D object.

6. The method of claim 1, further comprising:

receiving input requesting to insert the particular 3D object into the 3D environment;

determining one or more attributes of the particular 3D object;

determining that the one or more attributes of the particular 3D object do not match the stored context of the 3D environment; and providing for display, at the user interface of the HMD, an indication that the particular 3D object does not match the stored context of the 3D environment, and a prompt for further input to confirm whether the particular 3D object should be inserted into the 3D environment.

7. The method of claim 1, wherein the 3D environment includes a first portion of the 3D environment, and the method further comprises:

using a generative machine learning model to generate a second portion of the 3D environment based on the stored context.

8. The method of claim 7, wherein the first portion of the 3D environment comprises a first 3D room of a structure comprising a first plurality of 3D objects, and the second portion of the 3D environment comprises a second 3D room of the structure comprising a second plurality of 3D objects.

9. The method of claim 1, wherein:

querying the 3D content library further comprises identifying the at least one recommended 3D object as a 3D object that partially matches the stored context; and the method further comprises modifying the at least one recommended 3D object to cause the modified at least one 3D object to more closely match the stored context, and the one or more selectable options include an option for adding the modified at least one 3D object to the 3D environment.

10. The method of claim 9, wherein modifying the at least one recommended 3D object to cause the modified at least one 3D object to more closely match the stored context comprises:

inputting data associated with the at least one recommended 3D object to a generative machine learning model to generate the modified at least one 3D object.

11. The method of claim 1, wherein:

the method further comprises receiving voice input or text input; and obtaining the natural language description of the 3D environment is further based on the voice input or text input.

12. The method of claim 1, further comprising:

providing for display at the user interface of the HMD:

a prompt to confirm whether the natural language description of the 3D environment accurately describes the context of the 3D environment; and an option to modify the natural language description of the 3D environment.

13. The method of claim 1, wherein:

the method further comprises determining that the 3D environment is being generated based on inputs received from a first user and a second user; and determining the context of the 3D environment is further based on a first context associated with a first portion of the 3D environment generated based on inputs received from the first user, a second context associated with a second portion of the 3D environment generated based on inputs received from the second user, and a common context associated with the inputs received from the first user and the inputs received from the second user.

14. The method of claim 1, further comprising:

tracking a plurality of inputs received via the user interface in relation to the 3D environment; and storing indications of the plurality of received inputs at the data structure; and wherein:

determining the context of the 3D environment is further based on analyzing the stored indications of the plurality of received inputs; and providing for display a plurality of recommended 3D objects relevant to a stored current context of the 3D environment, including providing a first recommended 3D object at a first time, and, based on the stored indications of the plurality of received inputs, preventing display of the first recommended 3D object at a second time later than the first time, and instead providing a second recommended 3D object that is more similar to the current context.

15. The method of claim 1, further comprising:

determining a plurality of spatial relationships between a plurality of 3D objects of the 3D environment;

wherein the data structure is a graph data structure comprising a plurality of nodes and a plurality of edges between the plurality of nodes, the plurality of nodes corresponding to the plurality of 3D objects of the 3D environment and characteristics of the plurality of 3D objects of the 3D environment, and the plurality of edges corresponding to the plurality of spatial relationships between the plurality of 3D objects of the 3D environment; and wherein determining the context of the 3D environment is based at least in part on the plurality of nodes and the plurality of edges of the graph data structure.

16. A system comprising:

a data structure;

control circuitry configured to:

provide for display, via a head-mounted display (HMD), a user interface to facilitate creation of a three-dimensional (3D) environment;

based on one or more inputs received via the user interface, generate the 3D environment, wherein the 3D environment comprises a particular 3D object;

perform visual processing of the 3D environment to obtain a natural language description of the 3D environment, wherein the natural language description of the 3D environment comprises a natural language description of the particular 3D object;

determine a context of the 3D environment based at least in part on the natural language description of the 3D environment;

store the context in the data structure;

query a 3D content library, based on the natural language description of the 3D environment, to identify at least one recommended 3D object that is relevant to the stored context of the 3D environment, wherein the 3D content library comprises a plurality of 3D objects and associated natural language descriptions, wherein the plurality of 3D objects comprises the particular object, and wherein identifying the at least one recommended 3D object that is relevant to the stored context of the 3D environment is based on determining that the natural language description of the particular 3D object corresponds to the natural language description of the at least one recommended 3D object; and provide for display, at the user interface of the HMD, one or more selectable options to add the at least one recommended 3D object to the 3D environment.

17. The system of claim 16, wherein:

at a first time, the 3D environment includes a first 3D object, the natural language description of the 3D environment comprises a first natural language description for the first 3D object, and an initial context of the 3D environment is determined based on the first natural language description; and the control circuitry is further configured to:

at a second time later than the first time, receive an input to add a second 3D object to the 3D environment;

add the second 3D object to the 3D environment and obtaining a second natural language description for the second 3D object;

determine an updated initial context of the 3D environment based on the first natural language description and the second natural language description, and store the updated initial context at the data structure;

query the 3D content library, based on the first and second natural language descriptions of the 3D environment, to identify a particular 3D object that is relevant to the stored updated initial context of the 3D environment; and provide for display, at the user interface, a recommendation to add the particular 3D object to the 3D environment.

18. The system of claim 16, wherein:

the 3D content library comprises metadata stored in association with the plurality of 3D objects; and the control circuitry is configured to determine the context of the 3D environment further based at least in part on the metadata stored in association with the particular 3D object in the 3D content library.

19. The system of claim 16, wherein the control circuitry is configured to perform the visual processing of the 3D environment to obtain a natural language description of the 3D environment by:

inputting one or more attributes of the 3D environment into a machine learning model; and receiving, as output from the machine learning model based on the one or more attributes, the natural language description of the 3D environment.

20. The system of claim 19, wherein the control circuitry is configured to input the one or more attributes of the 3D environment into the machine learning model further by inputting data associated with the particular 3D object of the 3D environment into the machine learning model; and wherein the natural language description of the 3D environment output by the machine learning model comprises the natural language description of the particular 3D object.

* * * * *